(12) United States Patent
Sakatani

(10) Patent No.: US 10,477,075 B2
(45) Date of Patent: Nov. 12, 2019

(54) IMAGE FORMING APPARATUS, NON-TRANSITORY RECORDING MEDIUM STORING PAPER-INFORMATION OBTAINING PROGRAM, AND PAPER-INFORMATION OBTAINING METHOD

(71) Applicant: KONICA MINOLTA, INC., Tokyo (JP)

(72) Inventor: Kazuomi Sakatani, Machida (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/126,322

(22) Filed: Sep. 10, 2018

(65) Prior Publication Data

US 2019/0089870 A1    Mar. 21, 2019

(30) Foreign Application Priority Data

Sep. 15, 2017 (JP) ................................ 2017-177234

(51) Int. Cl.
*H04N 1/60* (2006.01)
*H04N 1/00* (2006.01)

(52) U.S. Cl.
CPC ....... *H04N 1/6094* (2013.01); *H04N 1/00034* (2013.01); *H04N 1/00068* (2013.01); *H04N 1/00092* (2013.01); *H04N 1/6033* (2013.01)

(58) Field of Classification Search
CPC ............. H04N 1/0075; H04N 1/00753; H04N 1/00726; H04N 1/00716; H04N 1/00681; H04N 1/6097
See application file for complete search history.

(56) References Cited

U.S. PATENT DOCUMENTS

2010/0253957 A1* 10/2010 Sano ...................... B41J 2/2114
358/1.9
2011/0057976 A1* 3/2011 Hatanaka ............... B41J 2/2114
347/15

FOREIGN PATENT DOCUMENTS

JP    2002271576 A    9/2002
JP    2015189549 A   11/2015

* cited by examiner

*Primary Examiner* — King Y Poon
(74) *Attorney, Agent, or Firm* — Buchanan Ingersoll & Rooney PC

(57) ABSTRACT

Provided are image forming apparatuses, non-transitory recording media each storing a computer-readable program for obtaining paper information, and paper-information obtaining methods. An image forming apparatus includes at least one reflection-type optical sensor that measures a sheet in a sheet path, and at least one backing configured to change optical density of a backing face which is to be placed under a sheet in the sheet path for a measurement of the sheet with each of the at least one reflection-type optical sensor. A hardware processor in a system including the image forming apparatus, causes the at least one reflection-type optical sensor to take measurements of a sheet in the sheet path by using different optical densities of the backing face, and calculates paper weight, which is weight of paper per unit area, of the sheet on the basis of the result of the measurements.

37 Claims, 12 Drawing Sheets

| FIRST SCANNER | WHITE | BLACK | BLACK | — |
|---|---|---|---|---|
| SECOND SCANNER | BLACK | WHITE | — | BLACK |
| COLORIMETER | — | — | WHITE | WHITE |

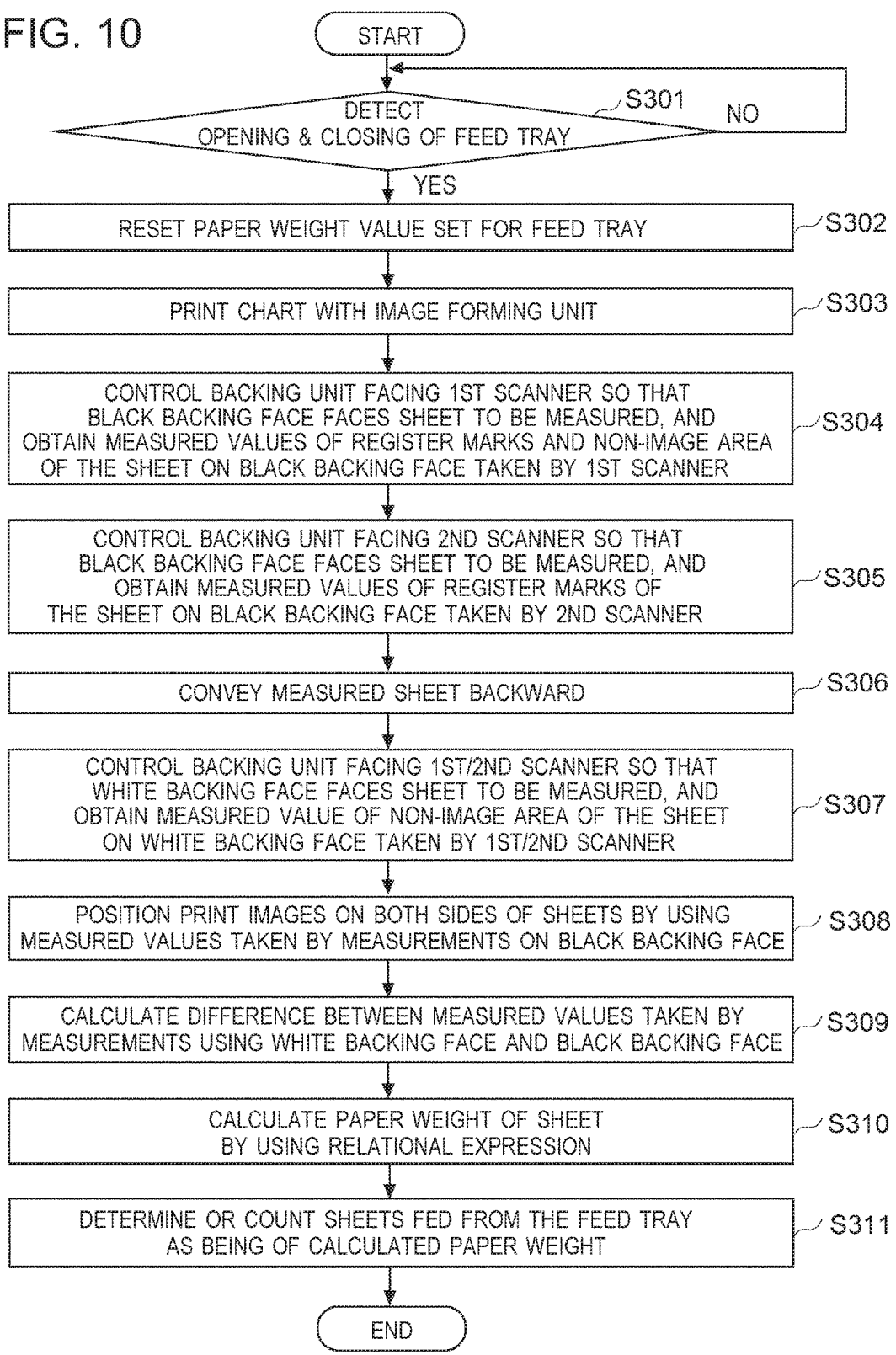

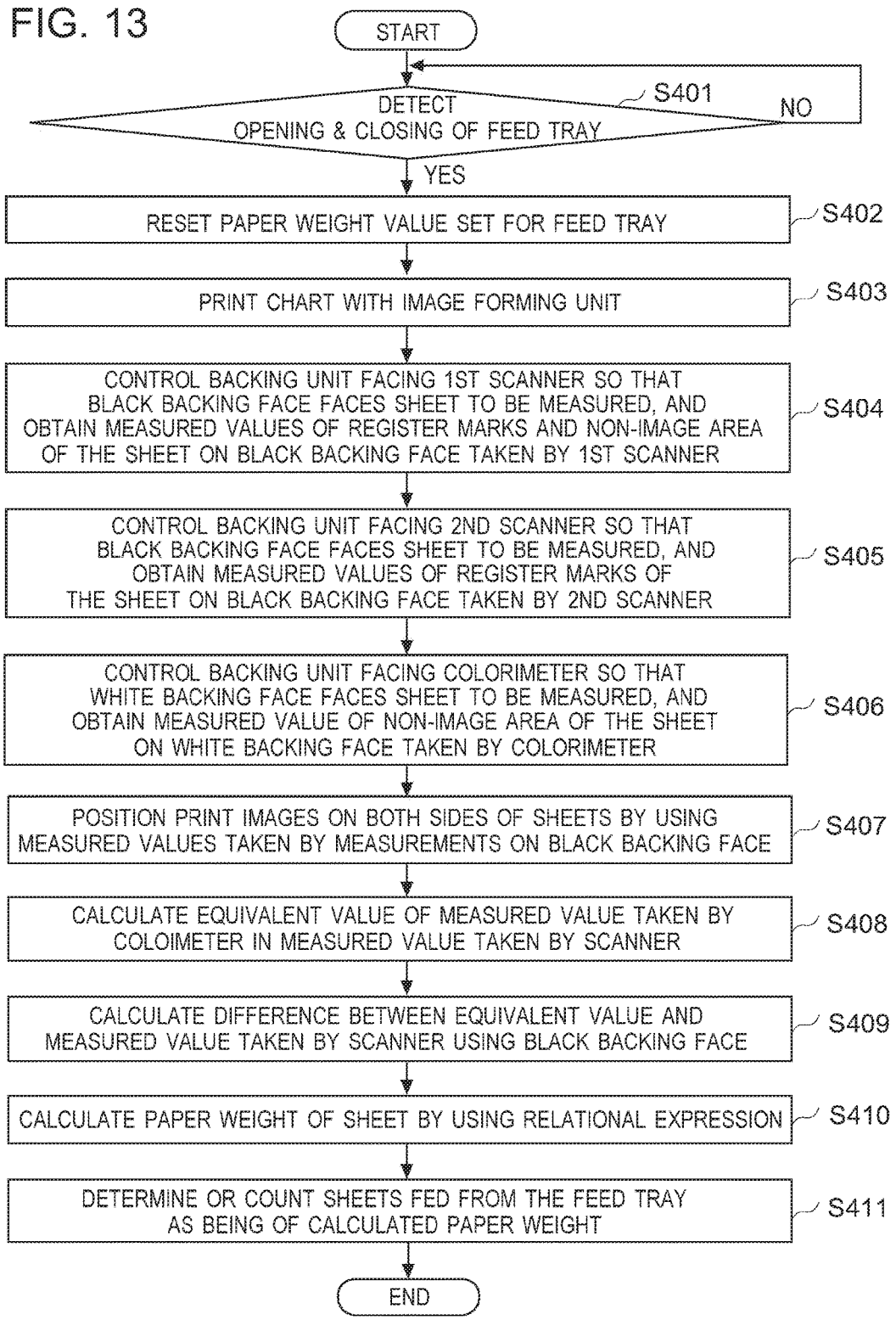

IMAGE FORMING APPARATUS, NON-TRANSITORY RECORDING MEDIUM STORING PAPER-INFORMATION OBTAINING PROGRAM, AND PAPER-INFORMATION OBTAINING METHOD

Japanese Patent Application No. 2017-177234 filed on Sep. 15, 2017, including description, claims, drawings, and abstract, the entire disclosure of which is incorporated herein by reference in its entirety.

TECHNOLOGICAL FIELD

The present invention is directed to image forming apparatuses, non-transitory recording media each storing a computer-readable program for obtaining paper information, and paper-information obtaining methods. In particular, the present invention is directed to image forming apparatuses each including a reflection-type in-line optical sensor, non-transitory recording media each storing a computer-readable paper-information obtaining program and paper-information obtaining methods, which can obtain information about paper properties easily.

BACKGROUND

In printers and other devices, colors are often converted by using a color conversion table or a color profile when colors are handled. Since color profiles depend on the thickness of sheets of printing paper, color conversion using a profile needs appropriate selection of a profile and/or adjustment of print conditions in accordance with the thickness of sheets of printing paper. Such color conversion needs information about the thickness of sheets of printing paper, which can be represented by paper weight or weight of paper per unit area (like grammage or basis weight), and in conventional color conversion, information about printing paper including the paper weight was given by an operator. However, information about printing paper given by an operator is not usually accurate and inappropriate information can be used for the color conversion. To avoid such a situation, there have been proposed various methods for obtaining paper information by using an optical sensor.

For example, Japanese Unexamined Patent Publication (JP-A) No. 2015-189549 discloses a paper-type detection apparatus. The apparatus includes an image capturing unit and a surface-property detector that measures a surface property of a sheet of paper by performing image processing on first image data of the sheet of paper captured by the image capturing unit. The apparatus further includes a thickness detector that causes the image capturing unit to capture second image data of a sheet of paper underlaid with a reference chart including black areas with predetermined optical densities, and measures the thickness of the sheet of paper based on a difference in optical density between the black areas in the reference chart and black areas in the second image data which show through the paper. The apparatus further includes a paper-type setter that sets the type of paper associated with the measured surface property and thickness.

As another example of a technique relating to an image capturing apparatus, which is not a method for obtaining paper information. JP-A No. 2002-271576 discloses the following image capturing apparatus. The image capturing apparatus includes an original conveyer that conveys an original, and an original pressing member that presses an original during conveyance with the original conveyer in a prescribed capturing area. The original pressing member includes a plurality of backing-color parts with different optical densities in a pressing portion of the original pressing member. The image reading apparatus further includes a capturing unit that captures an image of an original during conveyance with the original conveyer, where a capturing position of the capturing unit is variable within the prescribed capturing area.

Though the thickness of a sheet of printing paper can be measured by using the methods disclosed in the JP-A Nos. 2015-189549 and 2002-271576, these methods need, at each time to measure the thickness of a sheet of printing paper, a process to place a sheet of paper on a platen glass or in an ADF (automatic document feeder) by an operator, for capturing an image of the sheet. Such process needs operator's time and effort.

SUMMARY

The present invention is directed to image forming apparatuses, non-transitory recording media each storing a computer-readable program for obtaining paper information, and paper-information obtaining methods, which can obtain paper information easily, while saving operator's time and effort.

An image forming apparatus reflecting one aspect of the present invention comprises a print engine that forms an image on a sheet; a sheet conveyer that conveys a sheet on which the print engine formed an image, along a sheet path; at least one reflection-type optical sensor that measures a sheet in the sheet path; at least one backing, facing the at least one reflection-type optical sensor across the sheet path, configured to change optical density of a backing face which is to be placed under a sheet in the sheet path for a measurement of the sheet with each of the at least one reflection-type optical sensor, and a hardware processor. The hardware processor performs operations including causing the at least one reflection-type optical sensor to take measurements of a sheet in the sheet path by using different optical densities of the backing face, and calculating paper weight, which is weight of paper per unit area, of the sheet on the basis of a result of the measurements.

A non-transitory recording medium reflecting one aspect of the present invention stores a computer-readable program for obtaining paper information in a system including an image forming apparatus. The image forming apparatus includes a print engine that forms an image on a sheet; a sheet conveyer that conveys a sheet on which the print engine formed an image, along a sheet path; at least one reflection-type optical sensor that measures a sheet in the sheet path; and at least one backing, facing the at least one reflection-type optical sensor across the sheet path, configured to change optical density of a backing face which is to be placed under a sheet in the sheet path for a measurement of the sheet with each of the at least one reflection-type optical sensor. The program comprises instructions which, when executed by a hardware processor in the system, cause the hardware processor to perform operations comprising: controlling the optical density of the backing face for each measurement of a sheet in the sheet path; causing the at least one reflection-type optical sensor to take measurements of the sheet in the sheet path by using different optical densities of the backing face; and calculating paper weight, which is weight of paper per unit area, of the sheet on the basis of a result of the measurements.

A method of obtaining paper information in a system including an image forming apparatus. The image forming apparatus includes a print engine that forms an image on a sheet; a sheet conveyer that conveys a sheet on which the print engine formed an image, along a sheet path; at least one reflection-type optical sensor that measures a sheet in the sheet path; and at least one backing, facing the at least one reflection-type optical sensor across the sheet path, configured to change optical density of a backing face which is to be placed under a sheet in the sheet path for a measurement of the sheet with each of the at least one reflection-type optical sensor. The method comprises controlling the optical density of the backing face for each measurement of a sheet in the sheet path; causing the at least one reflection-type optical sensor to take measurements of the sheet in the sheet path by using different optical densities of the backing face; and calculating paper weight, which is weight of paper per unit area, of the sheet on the basis of a result of the measurements.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 10 is a flowchart illustrating an example of operations (obtaining paper information to be performed together with positioning of print images on both sides of sheets) of the image forming apparatus according to the third embodiment;

FIG. 13 is a flowchart illustrating an example of operations (obtaining paper information to be performed together with positioning of print images on both sides of sheets) of the image forming apparatus according to the forth embodiment.

DETAILED DESCRIPTION OF EMBODIMENTS

Figure 1:
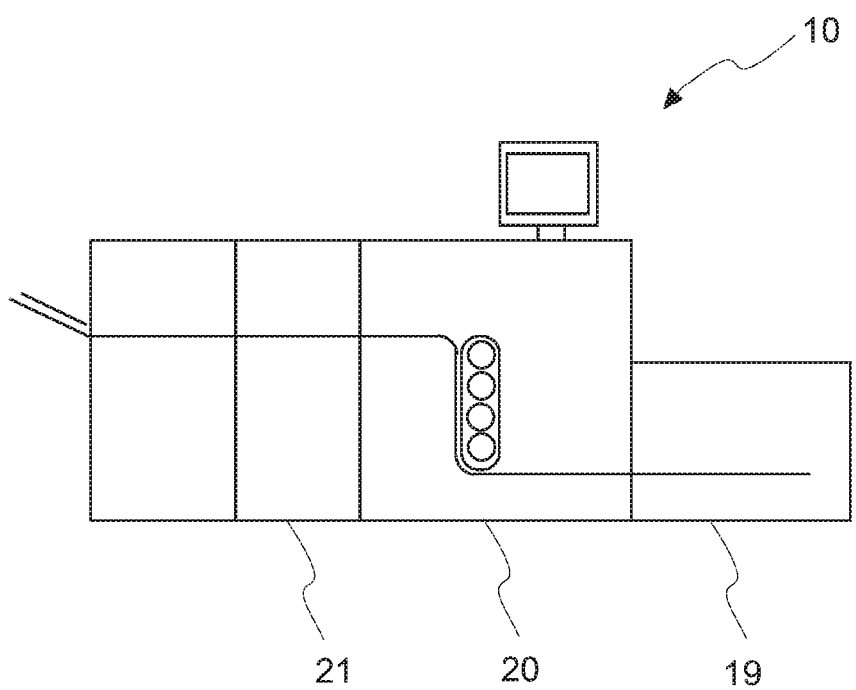
FIG. 1 is a schematic diagram illustrating an example of the constitution of an image forming apparatus according to the first embodiment.

Hereinafter, one or more embodiments of the present invention will be described with reference to the drawings. However, the scope of the invention is not limited to the illustrated embodiments.

As noted in the BACKGROUND, in printers and other devices, colors are often converted by using a color conversion table or a color profile when colors are handled. Since color profiles depend on the thickness of sheets of printing paper, color conversion using a profile needs appropriate selection of a profile and/or adjustment of print conditions in accordance with the thickness of sheets of printing paper. In conventional color conversion, information about printing paper including paper weight was given by an operator. However, information about printing paper given by an operator is not usually accurate. In view of that, there have been proposed various methods for obtaining paper information by using an optical sensor.

However, conventional methods need, at each time to measure the thickness of a sheet of printing paper, a process to place a sheet of paper on a platen glass or in an ADF (automatic document feeder) by an operator, for capturing an image of the sheet. Such process needs operator's time and effort. On the other hand, image forming apparatuses are configured to perform various operations for outputting desired printed matters, including correction of print-image quality, positioning of print images on both sides of sheets, and detecting a waste sheet. In these operations, at least one optical sensor including an in-line scanner, an in-line colorimeter or the like of the image forming apparatuses measures a sheet of printing paper.

In view of those, embodiments of the present invention use at least one reflection-type optical sensor which many image forming apparatuses are equipped with in an in-line manner (in other words, so as to measure a sheet in a sheet path), to obtain information about paper properties on the basis of a result of measurements of a sheet with the least one reflection-type optical sensor, together with various operations of an image forming apparatus. In other words, in a system including an image forming apparatus, a hardware processor in the system (a hardware processor of the image forming apparatus or another apparatus that controls the image forming apparatus) performs the following operations, where the image forming apparatus includes a print engine that forms an image on a sheet; a sheet conveyer that conveys a sheet on which the print engine formed an image, along a sheet path; at least one reflection-type optical sensor that measures a sheet in the sheet path; and at least one backing facing the at least one reflection-type optical sensor across the sheet path, configured to change optical density of a backing face (for example, change color of the backing face to one of two backing colors with different optical densities, like black and white) which is to be placed under a sheet in the sheet path for a measurement of the sheet with each of the at least one reflection-type optical sensor. The hardware processor performs a first process of controlling the optical density of the backing face for each measurement of a sheet in the sheet path; a second process of causing the at least one reflection-type optical sensor to take measurements of the sheet in the sheet path by using different optical densities of the backing face; and a third process of calculating paper weight, which is weight of paper per unit area, of the sheet on the basis of a result of the measurements. In concrete terms, the hardware processor uses at least one reflection-type optical sensor, including a scanner and/or a colorimeter (spectrocolorimeter), configured to measure a sheet in the sheet path, and at least one backing facing the at least one reflection-type optical sensor across the sheet path, configured to provide multiple optical densities of the backing face for measurements of the sheet with the at least one reflection-type optical sensor, and causes the at least one reflection-type optical sensor to take measurements of a non-image area (an unprinted or base area) of a sheet in the sheet path by using different optical densities of the backing face (for example, two backing colors with different optical densities like black and white). The hardware processor then calculates the paper weight of the sheet on the basis of a result of the measurements. It is preferable that the hardware processor performs these operations for obtaining paper information (the first to third processes) together with a process of correction of print-image quality, a process of positioning print images on both sides of sheets, or any other operations of the image forming apparatus.

For one example, the at least one reflection-type optical sensor of the image forming apparatus may include a line sensor arranged to face one side of a sheet in the sheet path. In the calculation of the paper weight, the hardware processor may be configured to perform the following operations. The hardware processor obtains a first measured value taken by a first measurement of the sheet in the sheet path with the line sensor by using one of the two backing colors with different optical densities, and obtains a second measured value taken by a second measurement of the sheet in the sheet path with the line sensor by using the other of the two backing colors, where the second measurement is taken after conveyance of the sheet measured in the first measurement backward in the sheet path by the sheet conveyer. The hardware processor then calculates a difference between the first measured value and the second measured value, and obtains a value of the paper weight corresponding to the difference, on the basis of a relational expression between paper weight values of sheets and differences between measured values of sheets taken by measurements of the sheets using the two backing colors, which was prepared in advance.

For another example, the at least one reflection-type optical sensor of the image forming apparatus may include two line sensors arranged to face two sides of a sheet in the sheet path, respectively. In the calculation of the paper weight, the hardware processor may be configured to perform the following operations. The hardware processor obtains a first measured value taken by a first measurement of the sheet in the sheet path with one of the two line sensors by using backing color with darker density among the two backing colors, and obtains a second measured value taken by a second measurement of the sheet in the sheet path with the other of the two line sensors by using backing color with lighter density among the two backing colors. The hardware processor then calculates a difference between the first measured value and the second measured value, and obtains a value of the paper weight corresponding to the difference, on the basis of the relational expression prepared in advance. On causing the at least one reflection-type optical sensor to take measurements of the sheet, the hardware processor may cause a first line sensor among the two line sensors, arranged to face one side of a sheet in the sheet path, to take a measurement of the sheet by using the backing color with darker density, and cause a second line sensor among the two line sensors, arranged to face the other side of a sheet in the sheet path, to take a measurement of the sheet by using the backing color with lighter density. Further, the operations for obtaining paper information (the first to third processes) may be performed together with a process of correction of print-image quality using a correction chart. The correction chart is printed by the print engine on a sheet and includes a register mark (and, preferably, a control strip to be used for the correction print-image quality) printed on a certain side of the sheet. The process of correction of print-image quality is performed on the basis of a measured value taken by a measurement of the correction chart with the first line sensor facing the certain side of the sheet, by using the backing color with darker density. In this case, in calculating the paper weight, the hardware processor may calculate the paper weight of the sheet by using the first measured value taken by a measurement of a non-image area of the correction chart with the first line sensor facing the certain side of the sheet by using the backing color with darker density, in the process of correction of print-image quality, and the second measured value taken by a measurement of a non-image area of the correction chart with the second line sensor facing the other side of the sheet by using the backing color with lighter density.

For another example, the at least one reflection-type optical sensor of the image forming apparatus may include a line sensor arranged to face one side of a sheet in the sheet path, and a spectrocolorimeter arranged to face one side of a sheet in the sheet path. In the calculation of the paper weight, the hardware processor may be configured to perform the following operations. The hardware processor obtains a first measured value taken by a first measurement of the sheet in the sheet path with the line sensor by using backing color with darker density among the two backing colors, and obtains a second measured value taken by a second measurement of the sheet in the sheet path with the spectrocolorimeter by using backing color with lighter density among the two backing colors. The hardware processor then converts the second measured value by calculating an equivalent value of the second measured value in a measured value taken by the second measurement of the sheet with the line sensor, on the basis of a mathematical expression prepared in advance for conversion. The hardware processor then calculates a difference between the first measured value and the equivalent value, and obtains a value of the paper weight corresponding to the difference, on the basis of the relational expression prepared in advance. In the conversion of the second measured value, the hardware processor may calculate the equivalent value by using the mathematical expression for conversion, prepared by obtaining information that correlates measured values taken by the line sensor and measured values taken by the spectrocolorimeter by using the backing color with lighter density in advance to the paper-information obtaining operations, and processing the information; or by using spectral reflectance values taken by the spectrocolorimeter by using the backing color with lighter density, and relative spectral distribution and spectral sensitivity of each of the light source and the light receiving elements of the line sensor. Further, the operations for obtaining paper information (the first to third processes) may be performed together with a process of positioning of print images on both sides of sheets, using a chart for the positioning of print images on both sides of sheets. The correction chart is printed by the print engine on a sheet and includes a register mark printed on each side of the sheet. The process of positioning of print images on both sides of sheets is performed on the basis of measured values taken by measurements of the register marks on both sides of the sheet in the sheet path with the two line sensors, by using black backing color. In this case, in calculating the paper weight, the hardware processor may calculate the difference and obtain the value of the paper weight by using a first measured value taken by a measurement of a non-image area of the chart with one of the two lines sensors by using the black backing color, in the process of positioning of print images on both sides of sheets, and a second measured value taken by a measurement of a non-image area of the chart with the one of the two line sensors by using white backing color, where the second measured value is taken after conveyance of the chart measured by using the black backing color backward in the sheet path by the sheet conveyer.

For another example, the at least one reflection-type optical sensor of the image forming apparatus may include a spectrocolorimeter arranged to face one side of a sheet in the sheet path, additionally to the two line sensors arranged to face two sides of a sheet in the sheet path, respectively. The operations for obtaining paper information (the first to third processes) may be performed together with a process of positioning of print images on both sides of sheets, using a chart for the positioning of print images on both sides of sheets. The chart is printed by the print engine on a sheet, and includes a register mark printed on each side of the sheet (and, preferably, further includes a trigger pattern which starts a measurement of the chart with the spectrocolorimeter, printed on one side of the sheet. The process of positioning of print images on both sides of sheets is performed on the basis of measured values taken by measurements of the register marks on both sides of the sheet in the sheet path with the two line sensors, by using black backing color. In this case, in calculating the paper weight, the hardware processor may perform the following operations. The hardware processor obtains a first measured value taken by a measurement of a non-image area of the chart with one of the two lines sensors by using the black backing color, in the process of positioning of print images on both sides of sheets, and obtains a second measured value taken by a measurement of a non-image area of the chart with the spectrocolorimeter by using white backing color. The hardware processor then converts the second measured color by calculating an equivalent value of the second measured value in a measured value taken by the second measurement of the chart with the one of the two line sensors, on the basis of a mathematical expression prepared in advance for conversion, calculates a difference between the first measured value and the equivalent value, and obtains a value of the paper weight corresponding to the difference, on the basis of the relational expression prepared in advance.

For another example, the image forming apparatus may further include at least one feed tray for containing sheets, and a tray open/close sensor that detects opening and closing of the at least one feed tray, and the hardware processor may perform the operations for obtaining paper information (the first to third processes), in response to the tray open/close sensor detecting opening and closing of a feed tray among the at least one feed tray. In this case, the hardware processor may use a sheet contained in the feed tray in which opening and closing were detected, to perform the operations for obtaining paper information (the first to third processes), and during a period starting at calculation of the paper weight of the sheet and ending at next detection of opening and closing of the feed tray, the hardware processor may determine one or more sheets fed from the feed tray in which opening and closing were detected, as being of the calculated paper weight. Further, in response to judging that a calculated value of the paper weight of the sheet does not match with a set value of the paper weight set for a feed tray that contained the sheet among the at least one feed tray, the hardware processor may output information about the mismatch between the calculated value and the set value.

By using at least one in-line optical sensor, including an in-line sensor and/or an in-line colorimeter, that an image forming apparatus is equipped with as described above, information about paper properties (paper information) can be obtained easily with saving operator's time and efforts. The operations for obtaining the paper information use an existing optical sensor or sensors in the image forming apparatus and needs no additional member exclusive for obtaining the paper information, like an automatic paper-type sensor (in other words, a medium sensor). Thereby, information about paper properties (paper information) can be obtained with saving the costs.

Embodiment 1

Figure 2A:
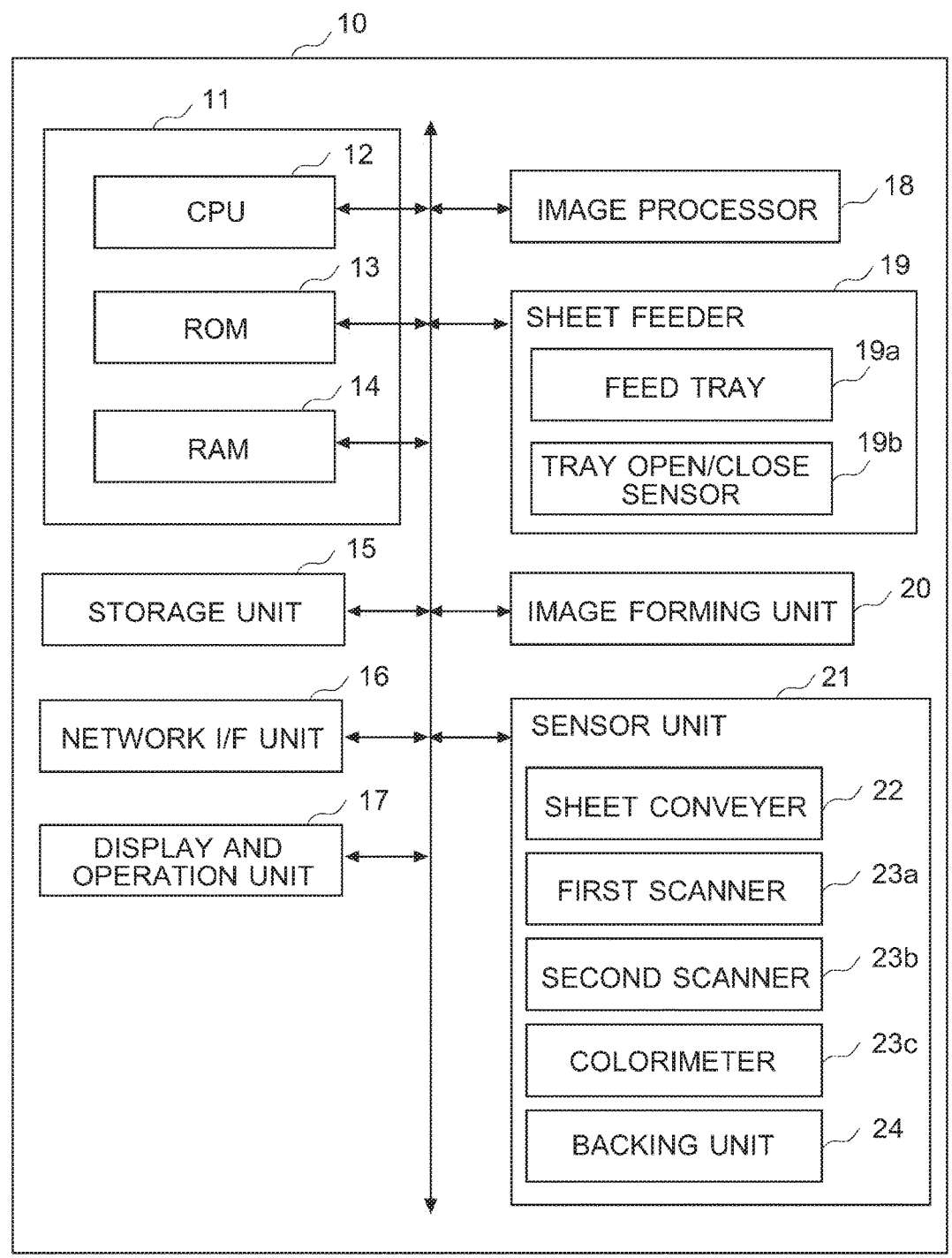
FIGS. 2A and 2B are block diagrams illustrating an example of the constitution of an image forming apparatus according to the first embodiment.
Figure 2B:
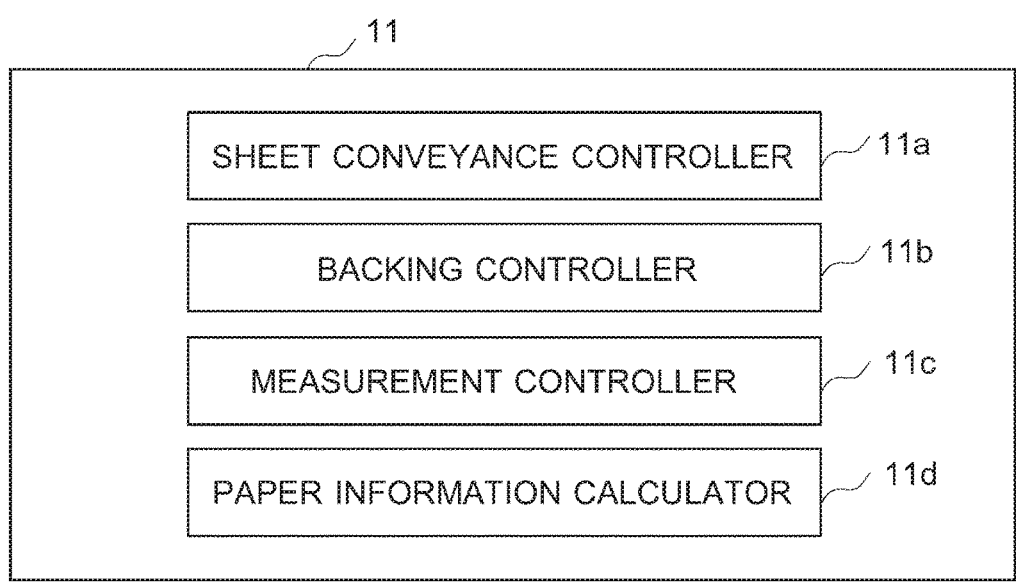
Figure 3A:
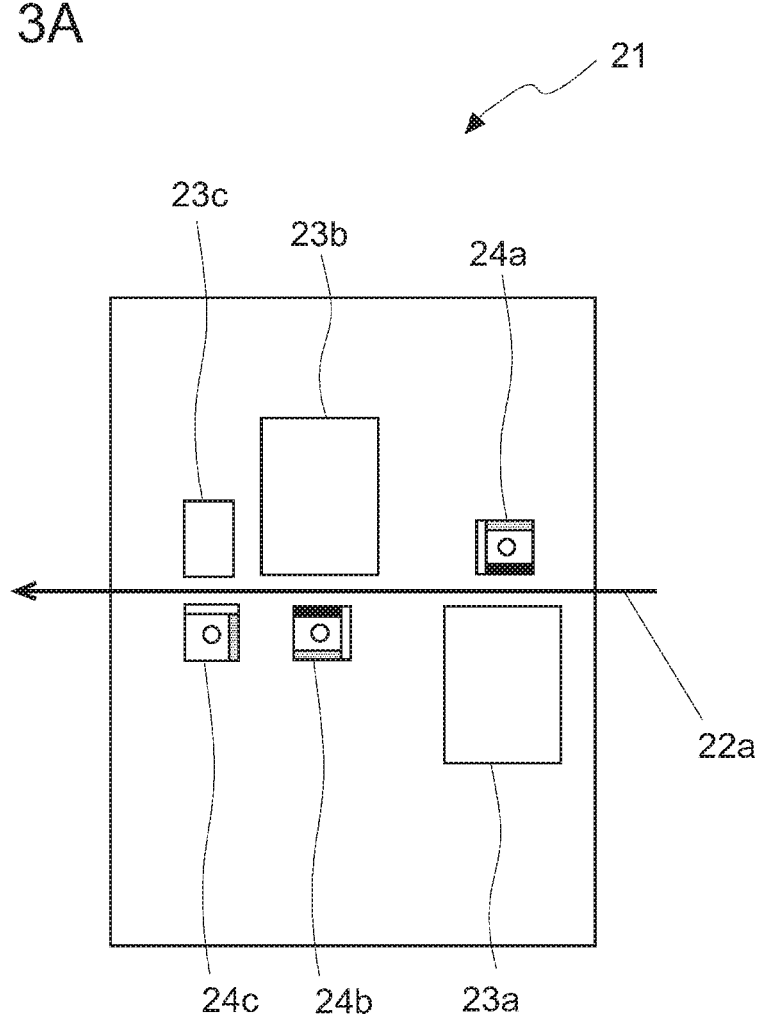
FIGS. 3A, 3B and 3C are schematic diagrams illustrating an example of the constitution of a sensor unit of the image forming apparatus according to the first embodiment.
Figure 3B:
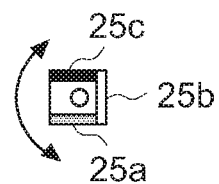
Figure 3C:
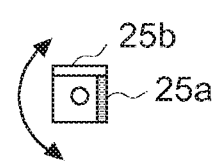
Figure 4:
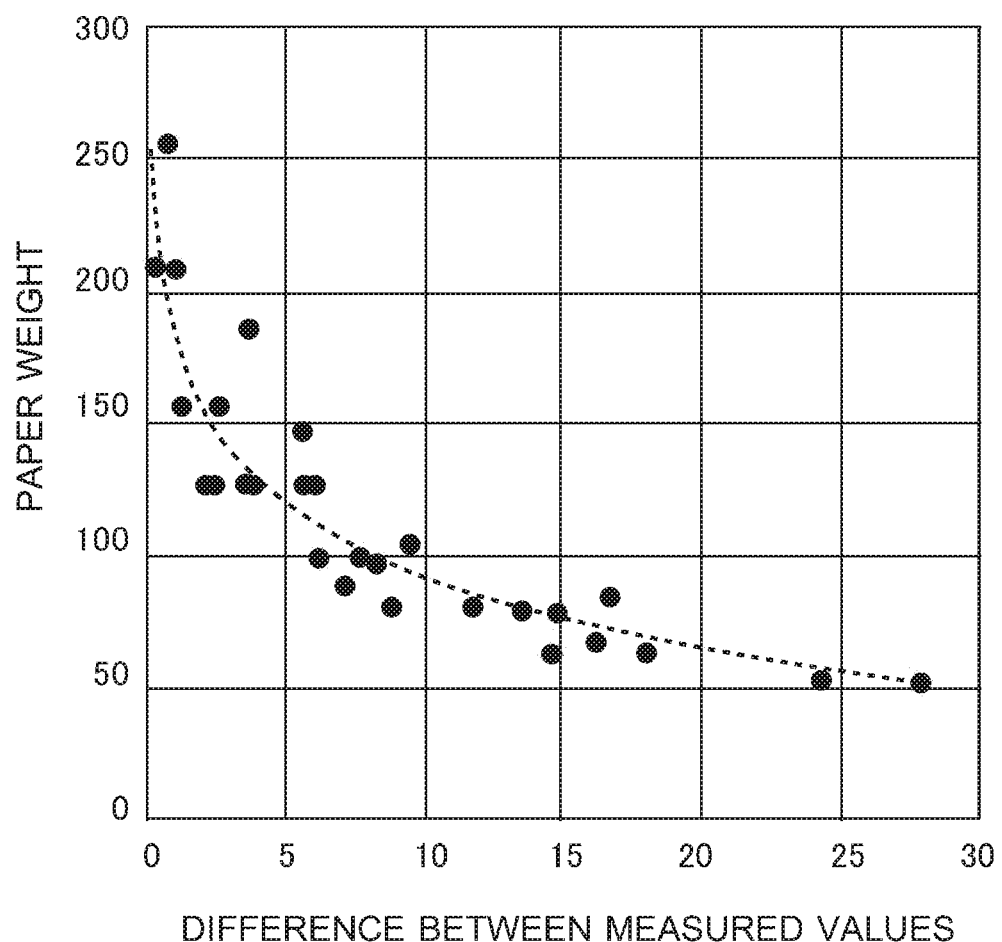
FIG. 4 is a graph illustrating a correlation between paper weights and differences between measured values taken by a scanner or scanners by using a white backing and a black backing.
Figure 5:
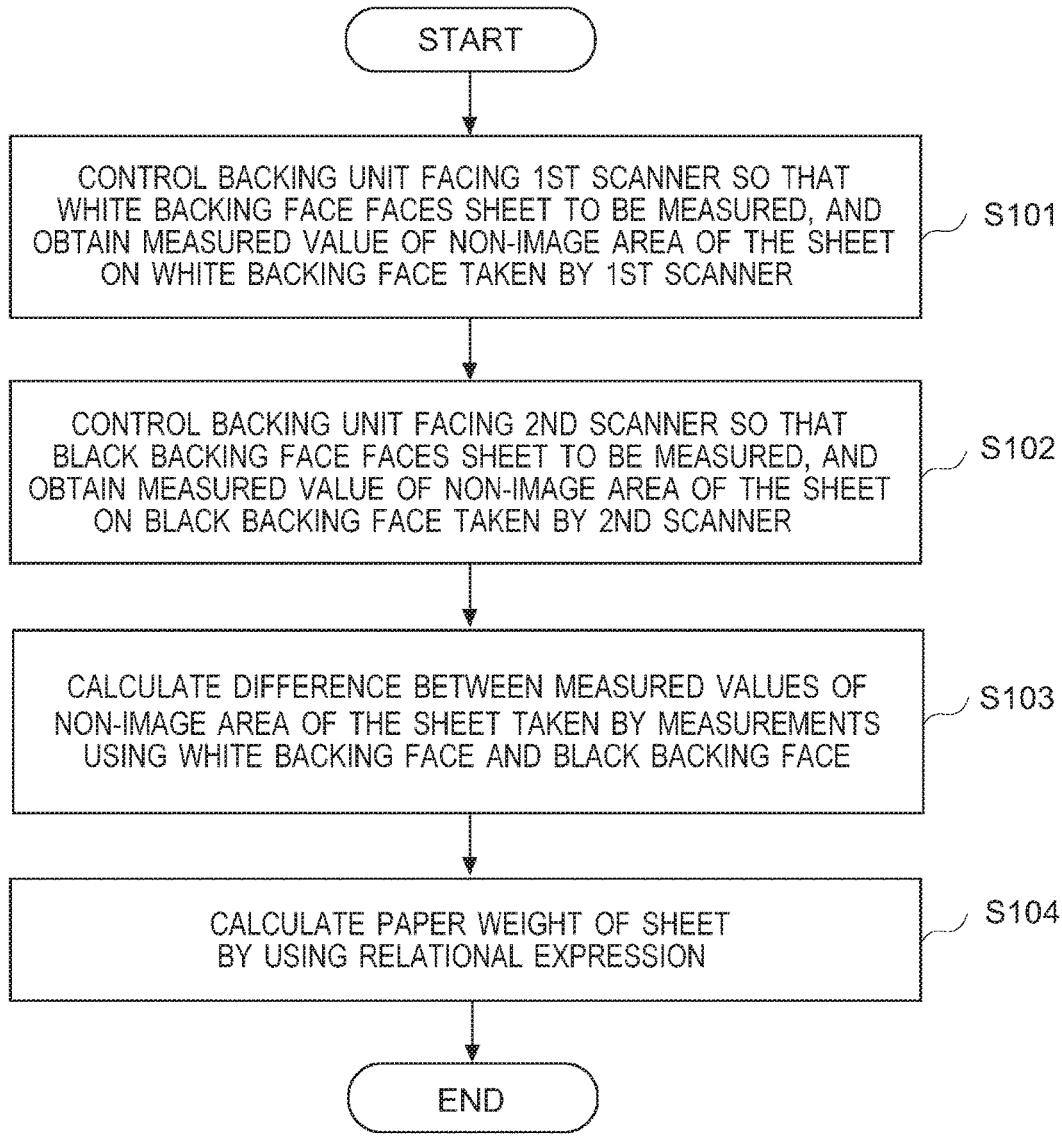
FIG. 5 is a flowchart illustrating an example of operations (obtaining paper information) of the image forming apparatus according to the first embodiment.
Figures 6, 7:
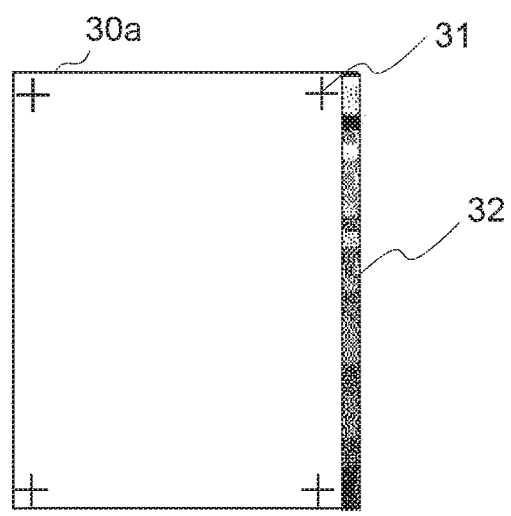
FIG. 6 is a table of combinations of a kind of an optical sensor and backing color according to the first embodiment.
FIG. 7 is a diagram illustrating an example of the layout of a sheet for correcting print-image quality.

In order to describe an embodiment of the present invention in more in detail, a description is given of an image forming apparatus, a non-transitory recording medium storing a paper-information obtaining program and a paper-information obtaining method according to Embodiment 1, with reference to FIG. 1 through FIG. 6. FIG. 1 is a schematic diagram illustrating an example of the constitution of an image forming apparatus according to the present embodiment, and FIGS. 2A and 2B are block diagrams illustrating an example of the constitution of the image forming apparatus according to the present embodiment. FIGS. 3A, 3B and 3C are schematic diagrams illustrating an example of the constitution of a sensor unit of the image forming apparatus according to the present embodiment. FIG. 4 is a graph illustrating a correlation between paper weights and differences between measured values taken by a scanner or scanners by using a white backing and a black backing. FIG. 5 is a flowchart illustrating an example of operations (obtaining paper information) of the image forming apparatus according to the present embodiment. FIG. 6 is a table of combinations of a kind of an optical sensor and backing color.

The present embodiment employs image forming apparatus 10 having the construction illustrated in FIG. 1, where example of the image forming apparatus 10 includes a MFP (multi-function peripheral). In image forming apparatus 10, sheets fed from sheet feeder 19 run thorough image forming unit (print engine) 20 and sensor unit 21 along the sheet path from the upstream end to the downstream end. A description is now given of the basic construction and control of image forming apparatus 10 according to the present embodiment.

FIGS. 2A and 2B are block diagrams illustrating an example the constitution of the image forming apparatus 10. As illustrated in FIG. 2A, image forming apparatus 10 includes built-in controller 11, storage unit 15, network interface (I/F) unit 16, display and operation unit 17, image processor 18, sheet feeder 19, image forming unit 20 and sensor unit 21.

Built-in controller 11 includes CPU (Central Processing Unit) 12 as a hardware processor, and memories including ROM (Read Only Memory) 13 and RAM (Random Access Memory) 14. CPU 12 reads out control programs stored in ROM 13 or storage unit 15, loads the control programs onto RAM 14, and executes the control programs, thereby performing operations of image forming apparatus 10.

Storage unit 15 is a non-transitory computer-readable recording medium including a HDD (Hard Disk Drive) and/or a SSD (Solid State Drive). Storage unit 15 stores programs which, when being executed, cause CPU 12 to control various components of image forming apparatus 10; information about operations and functions of the image forming apparatus 10; profiles; paper information including weight of paper per unit area like grammage or basis weight (which is referred to as paper weight in the following descriptions) of sheets stored in sheet feeder 19; a relational expression between paper weights values and differences between measured values taken by a scanner or scanners by using two baking colors (white and black), which will be described later, and other data.

Network interface unit 16 includes a NIC (Network Interface Card) and/or a modem. The network interface unit 16, as needed, connects image forming apparatus 10 to a communication network so as to be communicable with other devices (such as client terminals and an external controller).

Display and operation unit 17 is configured to display various screens relating to printing and allow an operator to perform, on the screens, various operations relating to printing. Examples of the display and operation unit 17 include a touch screen in which a pressure-sensitive operation unit (a touch sensor) composed of lattice-shaped transparent electrodes is arranged on a display unit like a LCD (liquid crystal display) or OEL (organic electro-luminescence) display. In the present embodiment, display and operation unit 17 is configured to, in response to a judgement of built-in controller 11 that a calculated value of the paper weight of a sheet does not match with a value of the paper weight which had been set for a feed tray that contained the sheet, display a warning screen that gives an operator information about the mismatch between the calculated value and the set value and then prompt an operator to input an appropriate paper weight value for the feed tray, according to instructions given by built-in controller 11.

Image processor 18 is configured to perform various kinds of image processing including color conversion using a profile, screening and rasterization, and send image data given after image processing to image forming unit 20.

Sheet feeder 19 includes one or more sets of feed tray 19a and tray open/close sensor 19b for detecting opening and closing of the feed tray 19a (for example, switches). Sheet feeder 19 is configured to feed sheets contained in feed tray 19a to image forming unit 20, according to instructions given by built-in controller 11.

Image forming unit (print engine) 20 is configured to form an image on a sheet on the basis of image data given after the image processing. For example, image forming unit 20 includes an exposure unit, a photoreceptor drum, a charging unit, a developing unit, a transfer belt and a fixing unit, which perform the following operations. In a process of forming an image, the exposure unit irradiates the photoreceptor drum which was charged by the charging unit, with a laser beam in accordance with an image, to form latent images to be printed, on the photoreceptor drum. The developing unit then develops the latent image by adhering charged toner onto the photoreceptor drum, and the developed toner image is transferred onto the transfer belt (first transfer processing), further is transferred from the transfer belt onto a sheet of paper (second transfer processing), and are fixed onto the sheet by the fixing unit. The sheet on which the image has been fixed is output from image forming unit 20 and conveyed to sensor unit 21.

Sensor unit 21 is arranged at the downstream side of image forming unit 20 and is a component configured to receive a sheet output from image forming unit 20 and measure color and/or tone of a received sheet for at least one of a process of correcting print-image quality, a process of positioning of print images on both sides of sheets, a process of detecting a waste sheet and a process of obtaining paper weight of sheets for printing. Sensor unit 21 is configured to take measurements of a sheet in a first mode or a second mode. In the first mode, sensor unit 21 takes measurements of a sheet with being placed on a backing face, which will be described later, by using different backing colors; and in the second mode, sensor unit 21 takes measurements of a sheet on with being placed on a backing face, by using the same backing color. FIGS. 3A, 3B and 3C are schematic diagrams illustrating an example of the constitution of sensor unit 21. As illustrated in FIG. 3A, sensor unit 21 includes sheet conveyer 22 for conveying sheets output from image forming unit 20 along sheet path 22a, in-line optical sensors (reflection-type optical sensors including first scanner 23a, second scanner 23b and colorimeter 23c in FIG. 3A), and backing units 24 (backing units 24a. 24b and 24c in FIG. 3A) arranged to face the optical sensors.

Examples of first scanner 23a and second scanner 23b include a line sensor (tri-linear sensor) composed of a light source and three individual lines of light receiving elements for independent red, blue, and green colors, extending along the main scanning direction. Each of first scanner 23a and second scanner 23b is configured to measure a face of a sheet by receiving light emitted from a light source and reflected on the face of a sheet with the RGB light receiving elements, and output measured RGB values. First scanner 23a is arranged to face one side of a sheet in sheet path 22a (to face the lower side of the sheet in sheet path 22a or being arranged under sheet path 22a in FIG. 3A), and is configured to measure light reflected on the face of a sheet in sheet path 22a and/or light passing through the sheet and then reflected on the backing face of backing unit 24a. Second scanner 23b is arranged to face the other side of a sheet in sheet path 22a (to face the upper side of the sheet in sheet path 22a or being arranged above sheet path 22a in FIG. 3A), and is configured to measure light reflected on the face of a sheet in sheet path 22a and/or light passing through the sheet and then reflected on the backing face of backing unit 24b.

Examples of colorimeter 23c include a measurement device supporting spectrophotometry (spectrocolorimeter) capable of measuring the light intensity at each wavelength. Colorimeter 23c is configured to measure a face of a sheet by receiving light emitted from a light source and reflected on the face of a sheet and output measured color values (such as L*a*b* values and XYZ values). Colorimeter 23c is arranged to face one side of a sheet in sheet path 22a (to face the upper side of the sheet in sheet path 22a or being arranged above sheet path 22a in FIG. 3A), and is configured to measure light reflected on the face of a sheet in sheet path 22a and/or light passing through the sheet and then reflected on the backing face of backing unit 24c.

Backing units 24 are backings arranged to face the optical sensors across sheet path 22a, respectively, and are configured to change optical density of a backing face which is to be placed under a sheet in sheet path 22a for a measurement of the sheet with each of the optical sensors. In the present embodiment, there are provided backing units 24a to 24c including backing faces to be placed under a sheet for measurements of the sheet with first scanner 23a, second scanner 23b and colorimeter 23c, configured to control the color of the backing face (for example, change the color of the backing face among two backing colors with different optical densities) for each of the measurements. In concrete terms, backing units 24a, 24b face first scanner 23a and second scanner 23b, respectively, and have the following construction. Each of backing units 24a. 24b includes correction face (backing face for shading correction) 25a, white backing face 25b and black backing face 25c, as illustrated in FIG. 3B and is configured to rotate and change a backing face to be used for a measurement of a sheet (to be placed under the sheet) by being driven by backing controller 11b. Backing units 24c faces colorimeter 23c, and includes correction face (backing face for shading correction) 25a and white backing face 25b, as illustrated in FIG. 3C and is configured to rotate and change a backing face to be used for a measurement of a sheet (to be placed under the sheet) by being driven by backing controller 11b. The backing face to be used for a measurement is changed in the following manner. For example, for a measurement of color printed on a face of a sheet, backing units 24a, 24b, 24c rotate so that white backing face 25b faces the corresponding optical sensor so as to be placed under the sheet. For another example, for detection of edges of a sheet (in a process of positioning of print images on both sides of sheets), or a measurement of a sheet under the condition that printing on the back side of the sheet does not show through the sheet, backing units 24a, 24b rotate so that black backing face 25c faces the corresponding optical sensor so as to be placed under the sheet. For another example, for obtaining paper information of a sheet, at least one of backing units 24a, 24b, 24c rotates so that white backing face 25b faces the corresponding optical sensor so as to be placed under the sheet and one of backing units 24a, 24b rotates so that black backing face 25c faces the corresponding optical sensor so as to be placed under the sheet. A reason why backing unit 24c facing colorimeter 23c does not have black backing face 25c in this embodiment, is that colorimeter 23c is mainly used for a color measurement and a white backing works better for a color measurement than backings of other colors. However, backing unit 24c may have black backing face 25c similarly to backing unit 24a facing first scanner 23a and backing unit 24b facing second scanner 23b. Further, backing units 24 in the present embodiment have the construction such that the backing face to be used for a measurement of a sheet changes in optical density or color by rotation. However, it should be noted that the construction should not be limited to the disclosed construction and the backing units 24 may have an arbitrary construction as far as different optical densities or different backing colors of backing faces can be selectively used for measurements of a sheet by at least one optical sensor.

As illustrated in FIG. 2B, built-in controller unit 11 is configured to work as sheet conveyance controller 11a, backing controller 11b, measurement controller 11c and paper information calculator 11d.

Sheet conveyance controller 11a is configured to control sheet conveyer 22 to convey sheets along sheet path 22a.

Backing controller 11b is configured to, in a process of obtaining paper information, rotate at least one of backing units 24 in sensor unit 21 to change the backing face to be used for a measurement of a sheet so that at least one optical sensor (at least one of first scanner 23a, second scanner 23b and colorimeter 23c) can take measurements of a non-image area of a sheet in sheet path 22a by using backing faces with different optical densities. In one example, backing controller 11b rotates backing unit 24a facing first scanner 23a (or backing unit 24b facing second scanner 23b) such that one of white backing face 25b and black backing face 25c faces scanner 23a (or second scanner 23b) to be used as the backing face for a measurement of a sheet, and then first scanner 23a (or second scanner 23b) measures a non-image area of a sheet on the backing face. After the measurement, sheet conveyance controller 11a controls sheet conveyer 22 to convey the measured sheet backward in sheet path 22a, and then backing controller 11b rotates backing unit 24a (or backing unit 24b) again such that the other of white backing face 25b and black backing face 25c faces scanner 23a (or second scanner 23b) to be used as the backing face for the next measurement of a sheet. First scanner 23a (or second scanner 23b) then measures a non-image area of the sheet on the backing face. In another example, backing controller 11b rotates backing unit 24a facing first scanner 23a such that white backing face 25b (or black backing face 25c) faces scanner 23a to be used as the backing face for a measurement of a sheet, and rotates backing unit 24b facing second scanner 23b such that black backing face 25c (or white backing face 25b) faces second scanner 23b to be used as the backing face for another measurement of the sheet, so that first scanner 23a and second scanner 23b can take measurements of a non-image area of the sheet by using different backing colors. In another example, backing controller 11b rotates backing unit 24a facing first scanner 23a or backing unit 24b facing second scanner 23b such that black backing face 25c faces first scanner 23a or second scanner 23b to be used as the backing face for a measurement of a sheet, and rotates backing unit 24c facing colorimeter 23c such that white backing face 25b faces colorimeter 23c to be used as the backing face for another measurement of the sheet, so that first scanner 23a or second scanner 23b and colorimeter 23c can take measurements of a non-image area of the sheet by using different backing colors.

Measurement controller 11c is configured to, in a process of obtaining paper information, obtain measured values taken with at least two of the optical sensors among first scanner 23a, second scanner 23b and colorimeter 23c (or measured values taken by two measurements with one of the optical sensors by using backing faces with different optical densities or different backing colors). For example, measurement controller 11c obtains a 8-bit value (0 to 255) as the measured value taken by first scanner 23a or second scanner 23b, and obtains a reflectance value (0 to 1) as the measured value taken by colorimeter 23c.

Paper information calculator 11d is configured to use the measured values obtained from at least two optical sensors among first scanner 23a, second scanner 23b and colorimeter 23c (or the measured values taken by the two measurements using one of the optical sensors) to calculate the difference between the measured values, and obtain a value of paper weight of the measured sheet corresponding to the calculated difference on the basis of a relational expression between paper weight values of sheets and differences between measured values of sheets taken by measurements with a scanner or scanners using white backing color and black backing color, which was prepared in advance. The relational expression can be prepared by, for example, the following operations. By using measured values taken by measurements of a non-image area of sheets of paper having various paper weights by using a white backing face for first scanner 23a and a black backing face for second scanner 23b, paper information calculator 11d associates differences between the measured values taken with the scanners by using a white backing face and a black backing face with corresponding paper weights, to create data points as illustrated in FIG. 4. Paper information calculator 11d then processes the data points (fits the data points to an arbitrary mathematical expression) by using a known method like the least squares method, to obtain the relational expression between paper weights of sheets and the differences of measured values of the sheets taken by using backing faces with different densities. A correlation between the differences of the measured values and paper weights as illustrated in FIG. 4 holds for various kinds of sheets for printing, other than transparent sheets. Paper information calculator 11d is further configured to, as needed, on judging that a calculated value of the paper weight of the sheet does not match with a set value of the paper weight set for a feed tray that contained the sheet among the at least one feed tray 19a, output notification information about the mismatch between the calculated value and the set value, by causing display and operation unit 17 to display a notification screen or performing another notification operations.

Herein, the above-mentioned sheet conveyance controller 11a, backing controller 11b. measurement controller 11c and paper information calculator 11d may be constituted as hardware devices. Alternatively, the above-mentioned sheet conveyance controller 11a, backing controller 11b, measurement controller 11c and paper information calculator 11d (in particular, the backing controller 11b, measurement controller 11c and paper information calculator 11d, in the present embodiment) may be provided by a paper-information obtaining program which causes built-in controller 11 to function as these sections when being executed by CPU 12. That is, built-in controller 11 may be configured to serve as the sheet conveyance controller 11a backing controller 11b, measurement controller 11c and paper information calculator 11d (in particular, the backing controller 11b, measurement controller 11c and paper information calculator 11d, in the present embodiment), when CPU 12 executes the paper-information obtaining program.

It should be noted that FIG. 1 to FIG. 3C illustrate image forming apparatus 10 for illustrative purpose only, and the constitution and control of them may be modified appropriately. For example, though the present embodiment showed image forming apparatus 10 equipped with three reflection-type optical sensors of first scanner 23a, second scanner 23b and colorimeter 23c in sensor unit 21, image forming apparatus 10 may be equipped with one of first scanner 23a, second scanner 23b and colorimeter 23c (preferably one of first scanner 23a and second scanner 23b). Alternatively, image forming apparatus 10 may be equipped with two reflection-type optical sensors of first scanner 23a and second scanner 23b, or first scanner 23a or second scanner 23b and colorimeter 23c. Further, though the present embodiment showed that built-in controller 11 in image forming apparatus 10 performs the above-described control operations, an external controller which was prepared separately from image forming apparatus 10 may perform the above-described control operations.

Hereinafter, a description is given of operations of image forming apparatus 10 having the above-described constitution. CPU 12 reads out a paper-information obtaining program stored in ROM 13 or storage unit 15, loads the program onto RAM 14, and executes the program, thereby executing the steps of the flowcharts illustrated in FIG. 5. The description is given under the assumption that image forming apparatus 10 is configured to measure both sides of a sheet in one pass (in other words, take measurements of the sheet in one conveyance), by using first scanner 23a and second scanner 23b. Alternatively, the operations may be performed by image forming apparatus 10 configured to use one of first scanner 23a, second scanner 23b and colorimeter 23c to measure one side of a sheet in two passes (in other words, take two measurements of the sheet in two conveyances), by conveying the sheet backward in the sheet path after the first measurement and then taking the second measurement. Further, the operations are performed under the assumption that the relational expression between differences between measured values of sheets taken with a scanner or scanners by using a white backing and a black backing and paper weight values of sheets has already been prepared and recorded in storage unit 15.

In response to operator's operations on display and operation unit 17 to instruct to obtain paper information with specifying one feed tray 19a, built-in controller 11 instructs the specified feed tray 19a in sheet feeder 19 to feed a sheet into the sheet path. The sheet then goes through image forming unit 20 and is conveyed to sensor unit 21.

Next, built-in controller 11 (backing controller 11b) controls backing unit 24a facing first scanner 23a so that white backing face 25b faces one side of the sheet in the sheet path (in other words, faces the upper side of the sheet in the sheet path or faces first scanner 23a across the sheet). Built-in controller 11 (measurement controller 11c) instructs first scanner 23a to measure the other side (the lower side or the side facing first scanner 23a) of the sheet and obtains a measured value of a non-image area (an unprinted or base area) of the sheet on the white backing face, from first scanner 23a (Step S101).

Next, built-in controller 11 (backing controller 11b) controls backing unit 24b facing second scanner 23b so that black backing face 25c faces the other side of the sheet in the sheet path (in other words, faces the lower side of the sheet in the sheet path or faces second scanner 23b across the sheet). Built-in controller 11 (measurement controller 11c) instructs second scanner 23b to measure the one side (the upper side or the side facing second scanner 23b) of the sheet and obtains a measured value of a non-image area (an unprinted or base area) of the sheet on the black backing face, from second scanner 23b (Step S102).

Next, built-in controller 11 (paper information calculator 11d) subtracts the measured value of the non-image area of the sheet taken by a measurement with second scanner 23b by using the black backing face from the measured value of the non-image area of the sheet taken by a measurement with first scanner 23a by using the white backing face, to obtain the difference between the measured values (Step S103). Built-in controller 11 (paper information calculator 11d) then uses the relational expression prepared in advance, to obtain a value of the paper weight of the measured sheet corresponding to the calculated difference (Step S104).

In the above-described operations, first scanner 23a used a white backing face for the measurement of a sheet and second scanner 23b used a black backing face for the measurement of the sheet. Alternatively, a value of the paper weight may be calculated by a combination of measured values taken by arbitrary measurements of a sheet in sheet path using a white backing and a black backing. For example, as illustrated in the table of FIG. 6, a value of the paper weight may be calculated by a combination of a measured value taken by first scanner 23a by using a black backing and a measured value taken by second scanner 23b by using white backing, or a combination of a measured value taken by first scanner 23a or second scanner 23b by using a black backing and a measured value taken by colorimeter 23c by using a white backing.

As described above, a use of at least one in-line optical sensor and at least one backing unit which can provide backing faces with different optical densities, arranged to face across sheet path 22a, allows image forming apparatus 10 to obtain information about paper properties with saving operator's time and efforts. Since the at least one optical sensor which already exists in the image forming apparatus 10 is used for obtaining the paper information, it allows the image forming apparatus 10 to obtain the paper information with saving the costs.

Embodiment 2

Figure 8:
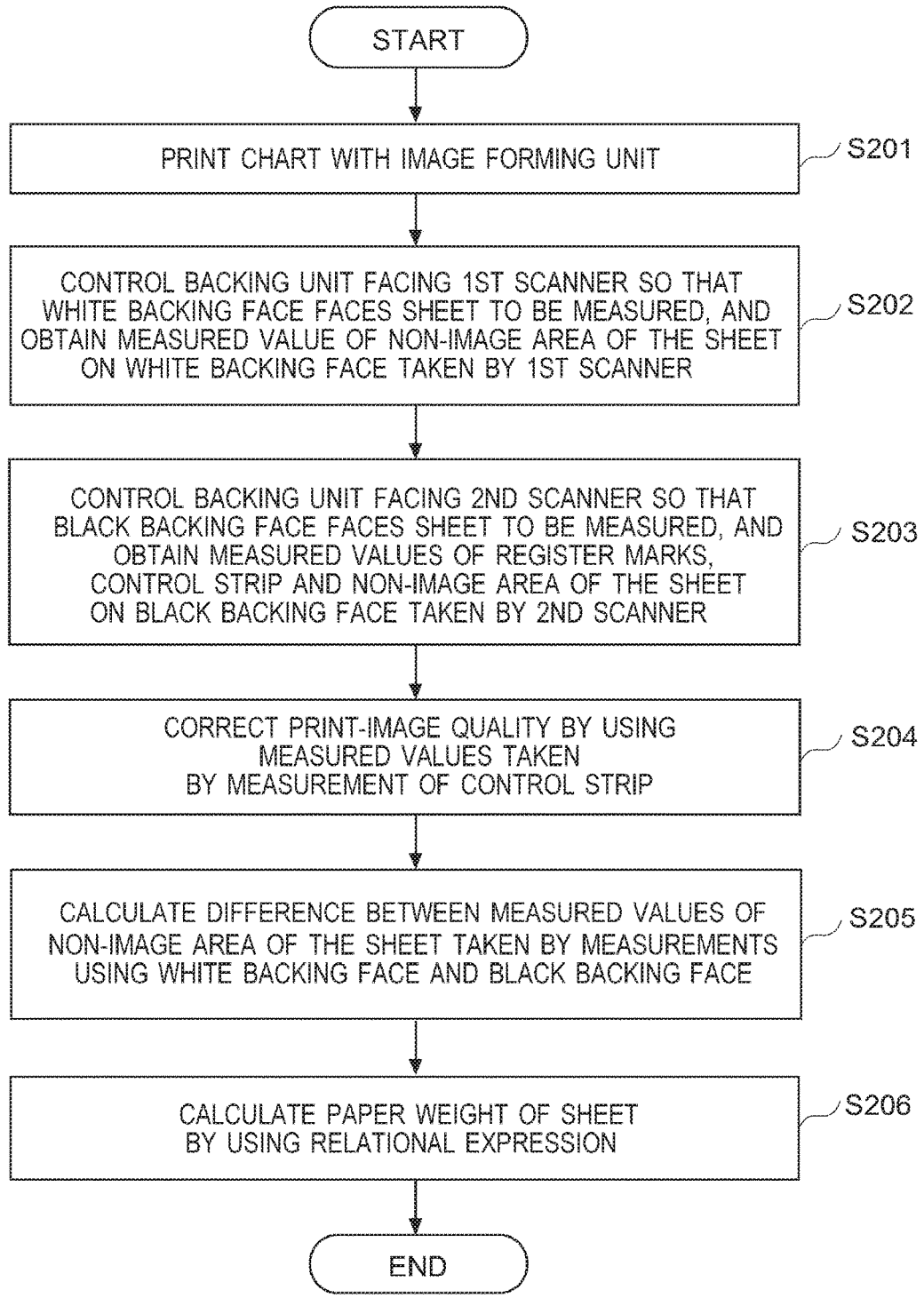
FIG. 8 is a flowchart illustrating an example of operations (obtaining paper information to be performed together with correction of print-image quality) of the image forming apparatus according to the second embodiment.

Next, a description is given of an image forming apparatus, a non-transitory recording medium storing a paper-information obtaining program and a paper-information obtaining method according to Embodiment 2, with reference to FIGS. 7 and 8. FIG. 7 is a diagram illustrating an example of the layout of a sheet for correcting print-image quality, and FIG. 8 is a flowchart illustrating an example of operations (obtaining paper information to be performed together with correction of print-image quality) of the image forming apparatus according to the present embodiment.

Though, in Embodiment 1, the description was given of a basic constitution and control operations of image forming apparatus 10, the present embodiment shows control operations to calculate the paper weight of a sheet, which are executed together with real-time correction of print-image quality in image forming apparatus 10 by using first scanner 23a and second scanner 23b. Image forming apparatus 10 of the present embodiment is configured to perform correction of print-image quality in one-side printing, by measuring at least a register mark printed on a sheet.

FIG. 7 is a diagram illustrating an example of the layout of a sheet for real-time correction of print-image quality (print-image-quality correction chart 30a). As illustrated in FIG. 7, print-image-quality correction chart 30a includes register marks 31, such as cross-hair marks, for positioning print images; and control strip 32 including an array of patches with different optical densities. Image forming apparatus 10 causes sensor unit 21 to measure these marks and patches printed on a sheet, and uses a measurement result obtained as the feedback from sensor unit 21 to perform correction of print-image quality.

The real-time correction of print-image quality needs a process to detect edges of the sheet (print-image-quality correction chart 30a), and the detection of sheet edges needs a use of a black backing for a measurement of a printed side (the upper side in the present embodiment) of the sheet. Therefore, built-in controller 11 (backing controller 11b) controls backing unit 24b facing second scanner 23b which can detect the printed side of the sheet so that black backing face 25c of the backing unit 24b faces the other side of the sheet in the sheet path (in other words, faces second scanner 23b across the sheet). Built-in controller 11 (backing controller 11b) further controls backing unit 24a facing first scanner 23a which can detect the other or un-printed side of the sheet so that white backing face 25b of the backing unit 24a faces the un-printed side of the sheet in the sheet path (in other words, faces first scanner 23a across the sheet), or controls backing unit 24b facing second scanner 23b so that black backing face 25c of the backing unit 24b faces the un-printed side of the sheet in the sheet path (in other words, faces second scanner 23b across the sheet) after a first measurement of the sheet on black backing face 25c by second scanner 23b. Thereby, image forming apparatus 10 can calculate paper weight of a sheet in a similar manner to Embodiment 1, together with the process of correction of print-image quality.

Hereinafter, a description is given of operations of image forming apparatus 10, in a case of obtaining paper information together with a process of correction of print-image quality. CPU 12 reads out a paper-information obtaining program stored in ROM 13 or storage unit 15, loads the program onto RAM 14, and executes the program, thereby executing the steps of the flowcharts illustrated in FIG. 8. The description is given under the assumption that image forming apparatus 10 is configured to use first scanner 23a and second scanner 23b to measure both sides of a sheet in one pass (in other words, take measurements of the sheet in one conveyance). Alternatively, the operations may be performed by image forming apparatus 10 configured to use one of first scanner 23a and second scanner 23b (preferably, use second scanner 23b) to measure one side of a sheet in two passes (in other words, take two measurements of the sheet in two conveyances), by conveying the sheet backward in the sheet path after the first measurement and then taking the second measurement. Further, the operations are performed under the assumption that the relational expression between differences between measured values taken with a scanner or scanners by using a white backing and a black backing and paper weight values has already been prepared and recorded in storage unit 15.

In response to operator's operations on display and operation unit 17 to instruct to correct print-image quality (or on judging that predetermined time has elapsed since the prior correction and that time to execute image-quality correction has come), built-in controller 11 instructs one feed tray 19a in sheet feeder 19 to feed a sheet into the sheet path, and causes image forming unit 20 to print print-image-quality correction chart 30a as illustrated in FIG. 7 (Step S201).

Next, built-in controller 11 (backing controller 11b) controls backing unit 24a facing first scanner 23a so that white backing face 25b faces one side (the printed side) of the sheet to be measured (print-image-quality correction chart 30a) in the sheet path (in other words, so that white backing face 25b faces first scanner 23a across the sheet). Built-in controller 11 (measurement controller 11c) instructs first scanner 23a to measure the other side of the sheet and obtains a measured value of a non-image area (an unprinted or base area) of the sheet on the white backing face, from first scanner 23a (Step S202).

Next, built-in controller 11 (backing controller 11b) controls backing unit 24b facing second scanner 23b so that black backing face 25c faces the other side of the sheet in the sheet path (in other words, so that black backing face 25c faces second scanner 23b across the sheet). Built-in controller 11 (measurement controller 11c) instructs second scanner 23b to measure the printed side (the side facing second scanner 23b) of the sheet and obtains measured values of register marks 31, control strip 32 and a non-image area (an unprinted or base area) of the sheet on the black backing face, from second scanner 23b (Step S203).

Next, built-in controller 1 uses the measured values of register marks 31 to determine the position of control strip 32, and uses the measured values of control strip 32 to correct print-image quality (Step S204).

Next, built-in controller 11 (paper information calculator 11d) subtracts the measured value of the non-image area of the sheet taken by a measurement with second scanner 23b by using the black backing face from the measured value of the non-image area of the sheet taken by a measurement with first scanner 23a by using the white backing face, to obtain the difference between the measured values (Step S205). Built-in controller 11 (paper information calculator 11d) then uses the relational expression prepared in advance, to obtain a value of the paper weight of the measured sheet corresponding to the calculated difference (Step S206).

As described above, calculation of paper weight of a sheet is executed together with a process of correction of print-image quality, by using at least one in-lire optical sensor and at least one backing unit which can provide backing faces with different optical densities, arranged to face across sheet path 22a. It allows image forming apparatus 10 to obtain information about paper properties with saving operator's time and efforts. Since the at least one optical sensor which already exists in the image forming apparatus 10 is used for obtaining the paper information, it allows the image forming apparatus 10 to obtain the paper information with saving costs.

Embodiment 3

Figure 9A:
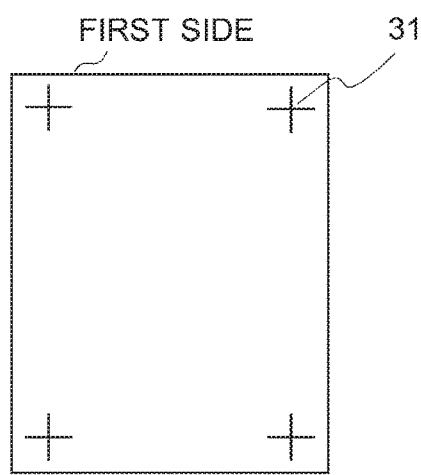
FIGS. 9A and 9B are diagrams illustrating an example of the layout of a sheet for positioning of print images on both sides of sheets.
Figure 9B:
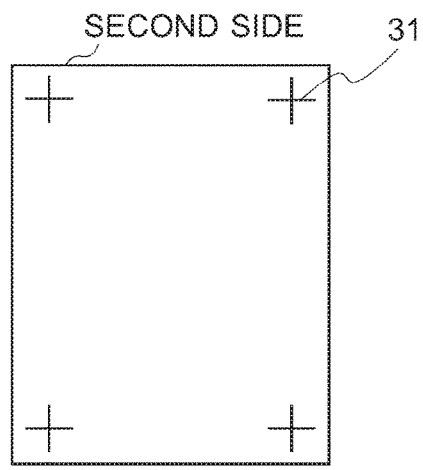

Next, a description is given of an image forming apparatus, a non-transitory recording medium storing a paper-information obtaining program and a paper-information obtaining method according to Embodiment 3, with reference to FIGS. 9A and 9B and FIG. 10. FIGS. 9A and 9B are diagrams illustrating an example of the layout of a sheet for positioning of print images on both sides of sheets, and FIG. 10 is a flowchart illustrating an example of operations (obtaining paper information to be performed together with positioning of print images on both sides of sheets) of the image forming apparatus according to the present embodiment.

Though, in Embodiment 2, the description was given of control operations to calculate the paper weight of a sheet, which are executed together with real-time correction of print-image quality in image forming apparatus 10, the present embodiment shows control operations to calculate the paper weight of a sheet, which are executed together with positioning of print images on both sides of sheets in image forming apparatus 10. Image forming apparatus 10 of the present embodiment is configured to measure register marks printed on both sides of a sheet and perform positioning of print images on both sides of sheets in two-side printing, where two scanners are used for the measurement of register marks on the both sides of the sheet.

It can be considered that detection of opening and closing of one feed tray 19a indicates that printing sheets have been loaded into the feed tray 19a at that time and the kind of sheets in the feed tray 19a remains the same before the next opening and closing of the feed tray 19a. Therefore, calculation of the paper weight is preferably executed at each time when one feed tray 19a has been opened and closed. The present embodiment shows control operations to calculate the paper weight in response to detection of opening and closing of one feed tray 19a with tray open/close sensor 19b.

In the following operations, the construction of image forming apparatus 10 is almost the same as that shown in Embodiment 1, but built-in controller 11 of image forming apparatus 10 of the present embodiment is further configured to monitor the output of tray open/close sensor 19b (or tray open/close sensors 19b if image forming apparatus 10 includes multiple tray open/close sensors 19b) and, in response to detection of outputting signals indicating detection of opening and closing of feed tray 19a (or one of feed trays 19a, if image forming apparatus 10 includes multiple feed trays 19a) from one tray open/close sensor 19b, execute the calculation of the paper weight of a sheet together with a process of positioning of print images on both sides of sheets.

FIGS. 9A and 9B are diagrams illustrating an example of the layouts of two sides of a sheet to be used for positioning print images on both sides of sheets (double-sided-printing registration chart 30b). FIG. 9A illustrates an example of the layout of the chart printed on one side (first side) of a sheet, to be measured by second scanner 23b and FIG. 9B illustrates an example of the layout of the chart printed on the other side (second side) of the sheet, to be measured by first scanner 23a. In positioning of print images on both sides of sheets, the scanners measure register marks 31, such as cross-hair marks. T-shaped marks and two pairs of parallel lines crossing diagonally, printed near the four corners on each sides of the sheet (double-sided-printing registration chart 30b). For accurate measurements, the scanners measure register marks 31 printed on the both sides of the sheet by using a black backing. In most cases, the other part of each side of the sheet is a non-image area (an unprinted or base area), and can be used for a measurement for calculating the paper weight of the sheet. Since there is a need to use a black backing for measurements by first scanner 23a and second scanner 23b for the positioning of print images on both sides of sheets, built-in controller 11 (sheet conveyance controller 11a) is configured to cause sheet conveyer 22 to convey the sheet backward in sheet path 22a after the first measurement of the sheet by using a black baking, so that one of first scanner 23a and second scanner 23b can take a second measurement of a non-image area (an unprinted or base area) of the sheet by using a white backing.

Hereinafter, a description is given of operations of image forming apparatus 10 configured to perform the above-described operations. CPU 12 reads out a paper-information obtaining program stored in ROM 13 or storage unit 15, loads the program onto RAM 14, and executes the program, thereby executing the steps of the flowcharts illustrated in FIG. 10. The description is given under the assumption that image forming apparatus 10 is configured to use first scanner 23a and second scanner 23b to measure both sides of a sheet in two passes (in other words, take two measurements of the sheet in two conveyances), by conveying the sheet backward in the sheet path after the first measurement and then taking the second measurement. Similarly to Embodiment 1, the operations are performed under the assumption that the relational expression between differences between measured values of sheets taken with a scanner or scanners by using a white backing and a black backing and paper weight values of sheets has already been prepared and recorded in storage unit 15.

Built-in controller 11 monitors signals output from tray open/close sensor 19b (Step S301). In response to receiving signals indicating detection of opening and closing of feed tray 19a (or one of feed trays 19a, if image forming apparatus 10 includes multiple feed trays 19a) from tray open/close sensor 19b (YES in Step S301), built-in controller 1 resets a value of the paper weight which had already been set for the feed tray 19a in which opening and closing actions have been detected (Step S302). Next, built-in controller 11 controls the feed tray 19a to convey a sheet to image forming unit 20 and controls image forming unit 20 to print double-sided-printing registration chart 30b on both sides (the first side and second side) of the sheet, as illustrated in FIGS. 9A and 9B (Step S303).

Next, built-in controller 11 (backing controller 11b) controls backing unit 24a facing first scanner 23a so that black backing face 25c faces the first side of the sheet (double-sided-printing registration chart 30b) in the sheet path (in other words, so that black backing face 25c faces first scanner 23a across the sheet). Built-in controller 11 (measurement controller 11c) instructs first scanner 23a to measure the second side (the side facing first scanner 23a) of the sheet and obtains measured values of register marks 31 and a non-image area (an unprinted or base area) of the sheet on the black backing face, from first scanner 23a (Step S304).

Next, built-in controller 1 (backing controller 11b) controls backing unit 24b facing second scanner 23b so that black backing face 25c faces the second side of the sheet in the sheet path (in other words, so that black backing face 25c faces second scanner 23b across the sheet). Built-in controller 11 (measurement controller 11c) instructs second scanner 23b to measure the first side (the side facing second scanner 23b) of the sheet and obtains measured values of register marks 31 on the sheet on the black backing face, from second scanner 23b (Step S305). In this flow, built-in controller 11 obtains the measured value of the non-image area in Step S304, but may obtain the measured value in Step S305. In other words, the measured value of the non-image area may be taken by a measurement of the sheet with any one of first scanner 23a and second scanner 23b.

Next, built-in controller 11 (sheet conveyance controller 11a) controls sheet conveyer 22 to convey the measured sheet along sheet path 22a backward to the measurement position for one of first scanner 23a and second scanner 23b (Step S306). Built-in controller 11 (backing controller 11b) then controls backing unit 24a facing first scanner 23a (or backing unit 24b facing second scanner 23b) so that white backing face 25b faces the first side (or the second side) of the sheet in the sheet path. Built-in controller 11 (measurement controller 11c) instructs first scanner 23a (or second scanner 23b) to measure the second side (or the first side) of the sheet and obtains a measured value of a non-image area (an unprinted or base area) of the sheet on the white backing face, from first scanner 23a (or second scanner 23b) (Step S307).

Next, built-in controller 11 uses the measured values of register marks 31 taken by first scanner 23a by using the black backing face and the measured values of register marks 31 taken by second scanner 23b by using the black backing face, to execute positioning of print images on both sides of sheets (Step S308).

Next, built-in controller 11 (paper information calculator 11d) subtracts the measured value of the non-image area of the sheet taken by using the black backing face in Step S304 or S305 from the measured value of the non-image area of the sheet taken by using the white backing face in Step S307, to obtain the difference between the measured values (Step S309). Built-in controller 11 (paper information calculator 11d) then uses the relational expression prepared in advance, to obtain a value of the paper weight of the measured sheet corresponding to the calculated difference (Step S310). Built-in controller 11 counts or determines one or more sheets fed from the feed tray 19a in which opening and closing were detected by tray open/close sensor 19b, as being of the calculated paper weight (Step S311). In these operations, during a period starting at calculation of the paper weight of the sheet, which was contained in the feed tray 19a in which opening and closing actions were detected, and ending at the next detection of opening and closing of the feed tray 19a, built-in controller 11 may determine one or more sheets fed from the feed tray 19a, as being of the calculated paper weight, and use the calculated paper weight to execute various operations of image forming apparatus 10. Further, in response to judging that the calculated value of the paper weight of the sheet does not match with a set value of the paper weight set for the feed tray 19a that contained the sheet, built-in controller 11 may output information about the mismatch between the calculated value and the set value by using an outputting device like display and operation unit 17.

In this flow, the sheet is measured with first scanner 23a and second scanner 23b by using a black backing faces, and then measured with first scanner 23a or second scanner 23b by using a white backing face after the sheet is conveyed backward to the measurement position of the scanner. However, the measurements and backward conveyance of the sheet can be performed in arbitrary order. For example, the sheet may be measured with first scanner 23a by using black backing face, then measured with first scanner 23a again by using white backing face after the sheet is conveyed back to the measurement position of the scanner, and then measured with second scanner 23b by using black backing face.

As described above, calculation of paper weight of a sheet is executed together with positioning of print images of both sides of sheets, by using at least one in-line optical sensor and at least one backing unit which can provide backing faces with different optical densities, arranged to face across the sheet path. It allows image forming apparatus 10 to obtain information about paper properties with saving operator's time and efforts. Since the at least one optical sensor which already exists in the image forming apparatus 10 is used for obtaining the paper information, it allows the image forming apparatus 10 to obtain the paper information with saving costs. Further, calculation of the paper weight of a sheet is executed in response to detection of opening and closing of a feed tray, and during a period starting at the calculation of the paper weight of the sheet and ending at the next detection of opening and closing of the feed tray, one or more sheets fed from the feed tray in which opening and closing were detected is determined as being of the calculated paper weight. Thereby, image forming apparatus 10 can obtain paper information timely with saving much more operator's time and efforts and costs.

Embodiment 4

Figure 11:
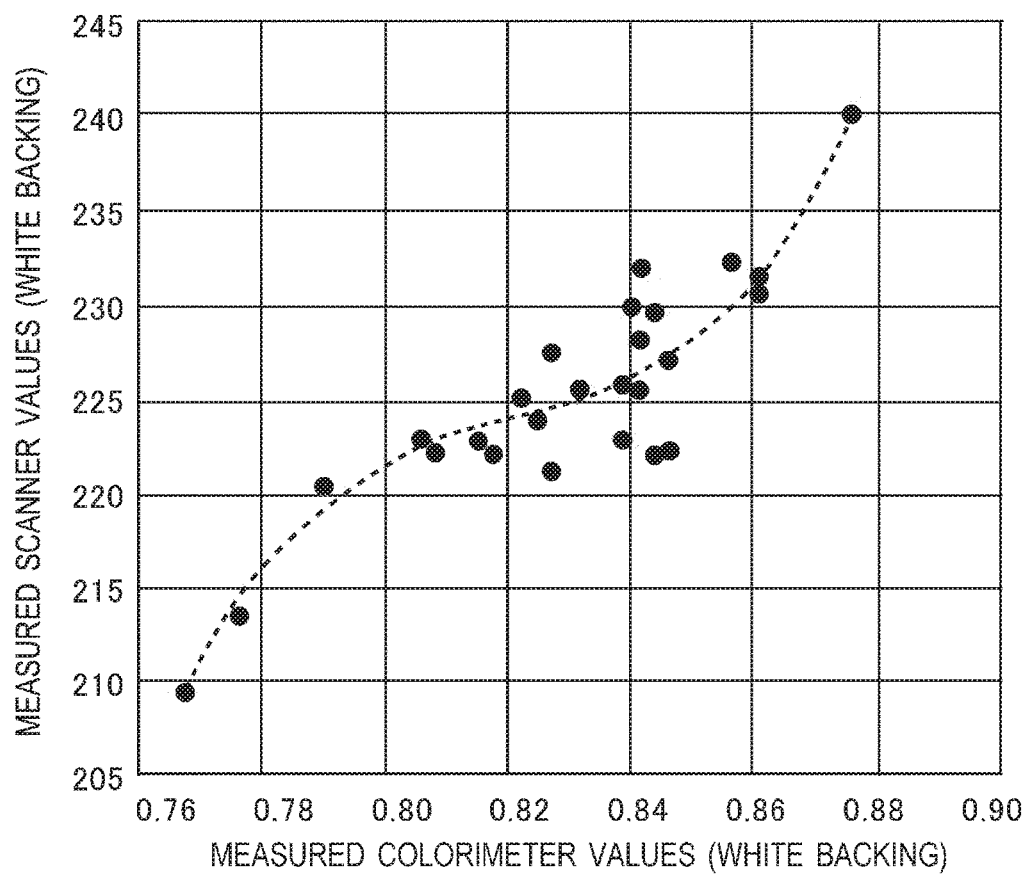
FIG. 11 is a graph illustrating a correlation between reflectance values taken by a colorimeter by using a white backing and measured values taken by a scanner by using a white backing.
Figure 12A:
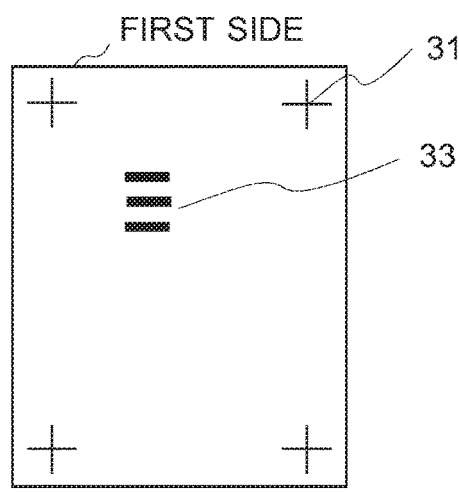
FIGS. 12A and 12B are diagrams illustrating an example of the layout of a sheet for positioning of print images on both sides of sheets.
Figure 12B:
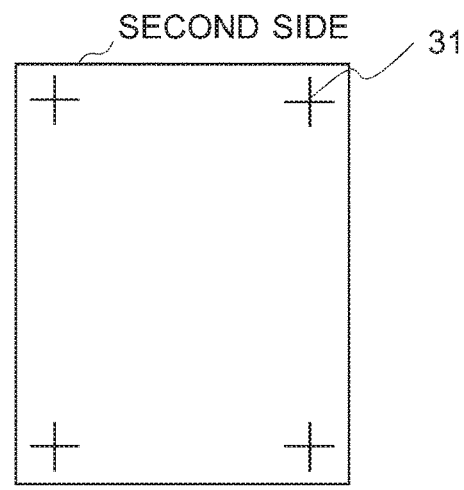

Next, a description is given of an image forming apparatus, a non-transitory recording medium storing a paper-information obtaining program and a paper-information obtaining method according to Embodiment 4, with reference to FIGS. 11 to 13. FIG. 11 is a graph illustrating a correlation between reflectance values taken by a colorimeter by using a white backing and measured values taken by a scanner by using a white backing. FIGS. 12A and 12B are diagrams illustrating an example of the layout of a sheet for positioning of print images on both sides of sheets. FIG. 13 is a flowchart illustrating an example of operations (obtaining paper information to be performed together with positioning of print images on both sides of sheets) of the image forming apparatus according to the present embodiment.

Though, in Embodiment 3, the description was given of control operations to convey a sheet backward in the sheet path for a second measurement of a non-image area of the sheet by using a white backing, the present embodiment shows control operations to use colorimeter 23c, which is not used usually for positioning print images on both sides of sheets, to take the second measurement of a non-image area of the sheet by using a white backing. Image forming apparatus 10 of the present embodiment is configured to measure register marks printed on both sides of a sheet and perform positioning of print images on both sides of sheets in two-side printing, where two scanners and a colorimeter are used for measurements. The operations need conversion of a measured value taken by a measurement of a sheet on a white backing with colorimeter 23c into an equivalent value, by calculating an equivalent value of the measured value taken by the measurement of a sheet on a white backing with colorimeter 23c in a measured value taken by the measurement of the sheet on a white backing with a scanner (first scanner 23a or second scanner 23b). A description is now given of two methods of the conversion.

The first conversion method uses a mathematical expression for the conversion. Measurements of a non-image area of sheets of various paper weights are taken with first scanner 23a or second scanner 23b and colorimeter 23c by using a white backing. The measured values (reflectance values) taken with colorimeter 23c by using a white backing is associated with the corresponding measured values taken with first scanner 23a or second scanner 23b by using a white backing, as points illustrated in the graph of FIG. 11. The mathematical expression for the conversion is prepared by fitting the points to a sufficient mathematical expression by using a known method like the least squares method. In the second conversion method, the conversion is done by using spectral characteristics (relative spectral distribution and spectral sensitivity) of each of a light source and CCDs (light receiving elements) of the scanner sensor, and spectral reflectance values taken by the colorimeter by using a white backing, to calculate an equivalent value of the measured value taken by the colorimeter by using a white backing in a measured value taken by first scanner 23a or second scanner 23b by using a white backing.

FIGS. 12A and 12B are diagrams illustrating an example of the layouts of two sides of a sheet to be used for positioning print images on both sides of sheets (double-sided-printing registration chart 30c). FIG. 12A illustrates an example of the layout of one side (first side) of the chart, to be measured by second scanner 23b and colorimeter 23c, and FIG. 12B illustrates an example of the layout of the chart printed on the other side (second side) of the sheet, to be measured by first scanner 23a. Double-sided-printing registration chart 30c includes trigger pattern 33 to be used for a trigger for a measurement by colorimeter 23c, additionally to register marks 31, such as cross-hair marks, T-shaped marks and two pairs of parallel lines crossing diagonally.

Hereinafter, a description is given of operations of image forming apparatus 10 according to the present embodiment. CPU 12 reads out a paper-information obtaining program stored in ROM 13 or storage unit 15, loads the program onto RAM 14, and executes the program, thereby executing the steps of the flowcharts illustrated in FIG. 13. The description is given under the assumption that image forming apparatus 10 is configured to use first scanner 23a, second scanner 23b and colorimeter 23c to measure both sides of a sheet in one pass (in other words, take measurements of the sheet in one conveyance). The operations are performed under the assumption that the mathematical expression for converting the measured value taken with the colorimeter by using a white backing into an equivalent value of the measured value in a measured value taken with one of the scanners by using a white backing, and the relational expression between differences between measured values of sheets taken with a scanner or scanners by using a white backing and a black backing and paper weight values of sheets have already been prepared and recorded in storage unit 15.

Built-in controller 11 monitors signals output from tray open/close sensor 19b (Step S401). In response to receiving signals indicating detection of opening and closing of feed tray 19a (or one of feed trays 19a, if image forming apparatus 10 includes multiple feed trays 19a) from tray open/close sensor 19b (YES in Step S401), built-in controller 11 resets a value of the paper weight which had already been set for the feed tray 19a in which opening and closing actions have been detected (Step S402). Next built-in controller 11 controls the feed tray 19a to convey a sheet to image forming unit 20 and controls image forming unit 20 to print double-sided-printing registration chart 30c on both sides (the first side and second side) of the sheet, as illustrated in FIGS. 12A and 12B (Step S403).

Next, built-in controller 11 (backing controller 11b) controls backing unit 24a facing first scanner 23a so that black backing face 25c faces the first side of the sheet (double-sided-printing registration chart 30c) in the sheet path (in other words, so that black backing face 25c faces first scanner 23a across the sheet). Built-in controller 11 (measurement controller 11c) instructs first scanner 23a to measure the second side (the side facing first scanner 23a) of the sheet and obtains measured values of register marks 31 and a non-image area (an unprinted or base area) of the sheet on the black backing face, from first scanner 23a (Step S404).

Next, built-in controller 11 (backing controller 11b) controls backing unit 24b facing second scanner 23b so that black backing face 25c faces the second side of the sheet in the sheet path (in other words, so that black backing face 25c faces second scanner 23b across the sheet). Built-in controller 11 (measurement controller 11c) instructs second scanner 23b to measure the first side (the side facing second scanner 23b) of the sheet and obtains measured values of register marks on the sheet on the black backing face, from second scanner 23b (Step S405). In this flow, built-in controller 11 obtains the measured value of the non-image area in Step S404, but may obtain the measured value in Step S405. In other words, the measured value of the non-image area may be taken by a measurement of the sheet by any one of first scanner 23a and second scanner 23b.

Next, built-in controller 11 (backing controller 11b) controls backing unit 24c facing colorimeter 23c so that white backing face 25b faces the second side of the sheet in the sheet path (in other words, so that white backing face 25b faces colorimeter 23c). Built-in controller 11 (measurement controller 11c) instructs colorimeter 23c to measure the first side (the side facing colorimeter 23c) of the sheet and obtains a non-image area (an unprinted or base area) of the sheet on the white backing face, from colorimeter 23c (Step S406).

Next, built-in controller 11 uses the measured values of register marks 31 taken by first scanner 23a by using the black backing face and the measured values of register marks 31 taken by second scanner 23b by using the black backing face, to execute positioning of print images on both sides of sheets (Step S407).

Next, built-in controller 11 (paper information calculator 11d) uses the mathematical expression for the conversion, recorded in advance in storage unit 15, to calculate an equivalent value of the measured value (reflectance value) taken by colorimeter 23c in Step S406 in a measured value taken by first scanner 23a or second scanner 23b by using a white backing (Step S408).

Next, built-in controller 11 (paper information calculator 11d) subtracts the measured value of the non-image area of the sheet taken by using the black backing face in Step S404 or S405 from the equivalent value of the measured value of the non-image area of the sheet taken by using the white backing face, calculated in Step S408, to obtain the difference between the measured value and the equivalent value (Step S409). Built-in controller 11 (paper information calculator 11d) then uses the relational expression prepared in advance, to obtain a value of the paper weight of the measured sheet corresponding to the calculated difference (Step S410). Built-in controller 11 determines or counts one or more sheets fed from the feed tray 19a in which opening and closing were detected by tray open/close sensor 19b, as being of the calculated paper weight (Step S411).

As described above, calculation of paper weight of a sheet is executed together with positioning of print images of both sides of sheets, by using at least one in-line optical sensor and at least one backing units which can provide backing faces with different optical densities, arranged to face across the sheet path. It allows image forming apparatus 10 to obtain information about paper properties with saving operator's time and efforts. Since the at least one optical sensor which already exists in the image forming apparatus 10 is used for obtaining the paper information, it allows the image forming apparatus 10 to obtain the paper information with saving costs. Further, since a colorimeter which already exists in the image forming apparatus 10 is used as the third optical sensor, there is no need to convey a measured sheet backward in the sheet path for taking a second measurement and it allows image forming apparatus 10 to obtain paper information more easily in comparison with the operations of Embodiment 3.

It should be noted that the present invention should not be limited to the above-described examples, and the constitution and control of the system and each device can be modified suitably, unless the modification deviates from the intention of the present invention.

For example, the above-described embodiments disclosed image forming apparatuses each including first scanner 23a for measuring the second (lower) side of a sheet in the sheet path, second scanner 23b for measuring the first (upper) side of a sheet in the sheet path and colorimeter 23c for measuring the first (upper) side of a sheet in a sheet path, arranged in this order from the upstream side in the sheet path. Alternatively, the number of optical sensors (scanners and colorimeters) and the arrangement of the optical sensors should not be limited to those disclosed in the embodiments. For example, the image forming apparatus may include second scanner 23b for measuring the first (upper) side of a sheet in the sheet, first scanner 23a for measuring the second (lower) side of a sheet in the sheet path, and colorimeter 23c for measuring the first (upper) side of a sheet in a sheet path, arranged in this order from the upstream side in the sheet path.

Moreover, although the above-described embodiments disclosed the operations to cause in-line optical sensors to measure a non-image area (an unprinted or base area) of a sheet in the sheet path to calculate the paper weight of a sheet, the operations may be done by causing in-line optical sensors to measure a predetermined image in which a certain area is filled in with solid color or uniform optical density, to calculate the paper weight of a sheet.

Moreover, although the above-described embodiments disclosed the operations to obtain paper information by using colorimeter 23c, the operations may be done by using single-color sensors for respective RGB colors housed in a relay unit configured to receive sheets output from image forming unit 20 and then pass the received sheets to a component or device to execute the succeeding (downstream) process.

Moreover, although the above-described embodiments disclosed operations to calculate the paper weight of a sheet as paper information, the disclosed operations and methods of obtaining paper information are also applicable to other operations to obtain an arbitrary kind of paper information which can be calculated from measured values taken by at least one optical sensor that an image forming apparatus is equipped with.

The present invention is applicable to image forming apparatuses equipped with at least one in-line optical sensor, computer-readable programs for obtaining paper information easily, non-transitory recording media each storing the computer-readable program for obtaining paper information and paper-information obtaining methods.

Although embodiments of the present invention have been described and illustrated in detail, it is clearly understood that the same is by way of illustration and example only and not limitation, the scope of the present invention should be interpreted by terms of the appended claims.

The invention claimed is:

1. An image forming apparatus comprising:
   a print engine that forms an image on a sheet;
   a sheet conveyer that conveys a sheet on which the print engine formed an image, along a sheet path;
   at least one reflection-type optical sensor that measures a sheet in the sheet path;
   at least one backing, facing the at least one reflection-type optical sensor across the sheet path, configured to change optical density of a backing face which is to be placed under a sheet in the sheet path for a measurement of the sheet with each of the at least one reflection-type optical sensor, and
   a hardware processor that performs paper-information obtaining operations including
      causing the at least one reflection-type optical sensor to take measurements of a sheet in the sheet path by using different optical densities of the backing face, and
      calculating paper weight, which is weight of paper per unit area, of the sheet on a basis of a result of the measurements.

2. The image forming apparatus of claim 1,
   wherein the at least one backing is configured to change color of the backing face among a plurality of backing colors, and
   the hardware processor causes the at least one reflection-type optical sensor to take measurements of a sheet in the sheet path by using more than one of the plurality of backing colors, to perform the paper-information obtaining operations.

3. The image forming apparatus of claim 1, further comprising:
   at least one feed tray for containing sheets; and
   a tray open/close sensor that detects opening and closing of the at least one feed tray,
   wherein the hardware processor performs the paper-information obtaining operations, in response to the tray open/close sensor detecting opening and closing of a feed tray among the at least one feed tray.

4. The image forming apparatus of claim 3,
   wherein the hardware processor uses a sheet contained in the feed tray in which opening and closing were detected, to perform the paper-information obtaining operations.

5. The image forming apparatus of claim 4,
   wherein, during a period starting at calculation of the paper weight of the sheet and ending at next detection of opening and closing of the feed tray, the hardware processor determines one or more sheets fed from the feed tray in which opening and closing were detected, as being of the paper weight calculated by the paper-information obtaining operations.

6. The image forming apparatus of claim 3,
   wherein the paper-information obtaining operations further include in response to judging that a calculated value of the paper weight of the sheet given by the paper-information obtaining operations does not match with a set value of the paper weight set for a feed tray that contained the sheet among the at least one feed tray, outputting information about a mismatch between the calculated value and the set value.

7. The image forming apparatus of claim 1,
wherein the at least one reflection-type optical sensor includes a line sensor arranged to face one side of a sheet in the sheet path,
the at least one backing is configured to change color of the backing face to either of two backing colors with different optical densities, and
the calculating paper weight includes
obtaining a first measured value taken by a first measurement of the sheet in the sheet path with the line sensor by using one of the two backing colors,
obtaining a second measured value taken by a second measurement of the sheet in the sheet path with the line sensor by using the other of the two backing colors, the second measurement being taken after conveyance of the sheet measured in the first measurement backward in the sheet path by the sheet conveyer,
calculating a difference between the first measured value and the second measured value, and
obtaining a value of the paper weight corresponding to the difference, on a basis of a relational expression between paper weight values of sheets and differences between measured values of sheets taken by measurements using the two backing colors, prepared in advance.

8. The image forming apparatus of claim 1,
wherein the at least one reflection-type optical sensor includes two line sensors arranged to face two sides of a sheet in the sheet path, respectively,
the at least one backing is configured to change color of the backing face to either of two backing colors with different optical densities, and
the calculating paper weight includes
obtaining a first measured value taken by a first measurement of the sheet in the sheet path with one of the two line sensors by using backing color with darker density among the two backing colors,
obtaining a second measured value taken by a second measurement of the sheet in the sheet path with the other of the two line sensors by using backing color with lighter density among the two backing colors,
calculating a difference between the first measured value and the second measured value, and
obtaining a value of the paper weight corresponding to the difference, on a basis of a relational expression between paper weight values of sheets and differences between measured values of sheets taken by measurements using the two backing colors, prepared in advance.

9. The image forming apparatus of claim 8,
the causing the at least one reflection-type optical sensor includes
causing a first line sensor among the two line sensors, arranged to face one side of a sheet in the sheet path, to take a measurement of the sheet in the sheet path by using the backing color with darker density, and
causing a second line sensor among the two line sensors, arranged to face the other side of a sheet in the sheet path, to take a measurement of the sheet in the sheet path by using the backing color with lighter density.

10. The image forming apparatus of claim 9,
wherein the hardware processor performs the paper-information obtaining operations together with a process of correction of print-image quality using a correction chart printed by the print engine on a sheet, including a register mark printed on a certain side of the sheet, where the process of correction of print-image quality is performed on a basis of a measured value taken by a measurement of the correction chart with the first line sensor facing the certain side of the sheet, by using the backing color with darker density, and
the calculating paper weight includes
calculating the paper weight of the sheet by using
the first measured value taken by a measurement of a non-image area of the correction chart with the first line sensor facing the certain side of the sheet by using the backing color with darker density, in the process of correction of print-image quality, and
the second measured value taken by a measurement of a non-image area of the correction chart with the second line sensor facing the other side of the sheet by using the backing color with lighter density.

11. The image forming apparatus of claim 10,
wherein the correction chart further includes a control strip to be used for the correction of print-image quality.

12. The image forming apparatus of claim 1,
wherein the at least one reflection-type optical sensor includes a line sensor arranged to face one side of a sheet in the sheet path, and a spectrocolorimeter arranged to face one side of a sheet in the sheet path,
the at least one backing is configured to change color of the backing face to either of two backing colors with different optical densities, and
the calculating paper weight includes
obtaining a first measured value taken by a first measurement of the sheet in the sheet path with the line sensor by using backing color with darker density among the two backing colors,
obtaining a second measured value taken by a second measurement of the sheet in the sheet path with the spectrocolorimeter by using backing color with lighter density among the two backing colors,
converting the second measured value by calculating an equivalent value of the second measured value in a measured value taken by the second measurement of the sheet with the line sensor, on a basis of a mathematical expression for conversion, prepared in advance,
calculating a difference between the first measured value and the equivalent value, and
obtaining a value of the paper weight corresponding to the difference, on a basis of a relational expression between paper weight values of sheets and differences between measured values of sheets taken by measurements using the two backing colors, prepared in advance.

13. The image forming apparatus of claim 12,
wherein the converting the second measured value includes
calculating the equivalent value by using the mathematical expression for conversion, prepared by obtaining information that correlates measured values taken by the line sensor and measured values taken by the spectrocolorimeter by using the backing color with lighter density in advance to the paper-information obtaining operations, and processing the information.

14. The image forming apparatus of claim 12,
wherein the line sensor includes a light source and light receiving elements, and
the converting the second measured value includes
calculating the equivalent value by using spectral reflectance values taken by the spectrocolorimeter by using the backing color with lighter density, and relative spectral distribution and spectral sensitivity of each of the light source and the light receiving elements of the line sensor.

15. The image forming apparatus of claim 8,
wherein the hardware processor performs the paper-information obtaining operations together with a process of positioning of print images on both sides of sheets, using a chart for the positioning of print images on both sides of sheets, printed by the print engine on a sheet, the chart including a register mark printed on each side of the sheet, where the process of positioning of print images on both sides of sheets is performed on a basis of measured values taken by measurements of the register marks on both sides of the sheet in the sheet path with the two line sensors, by using black backing color, and
the calculating paper weight includes
calculating the difference and obtaining the value of the paper weight by using
a first measured value taken by a measurement of a non-image area of the chart with one of the two lines sensors by using the black backing color, in the process of positioning of print images on both sides of sheets, and
a second measured value taken by a measurement of a non-image area of the chart with the one of the two line sensors by using white backing color, the second measured value being taken after conveyance of the chart measured by using the black backing color backward in the sheet path by the sheet conveyer.

16. The image forming apparatus of claim 8,
wherein the at least one reflection-type optical sensor further includes a spectrocolorimeter arranged to face one side of a sheet in the sheet path,
wherein the hardware processor performs the paper-information obtaining operations together with a process of positioning of print images on both sides of sheets, using a chart for the positioning of print images on both sides of sheets, printed by the print engine on a sheet, the chart including a register mark printed on each side of the sheet, where the process of positioning of print images on both sides of sheets is performed on a basis of measured values taken by measurements of the register marks on both sides of the sheet in the sheet path with the two line sensors, by using black backing color, and
the calculating paper weight include
obtaining a first measured value taken by a measurement of a non-image area of the chart with one of the two lines sensors by using the black backing color, in the process of positioning of print images on both sides of sheets,
obtaining a second measured value taken by a measurement of a non-image area of the chart with the spectrocolorimeter by using white backing color,
converting the second measured color by calculating an equivalent value of the second measured value in a measured value taken by the second measurement of the chart with the one of the two line sensors, on a basis of a mathematical expression for conversion, prepared in advance,
calculating a difference between the first measured value and the equivalent value, and
obtaining a value of the paper weight corresponding to the difference, on a basis of a relational expression between paper weight values of sheets and differences between measured values of sheets taken by measurements using the black and white backing colors, prepared in advance.

17. The image forming apparatus of claim 16,
wherein the chart for the positioning of print images on both sides of sheets, includes a trigger pattern which starts a measurement of the chart with the spectrocolorimeter, printed on one side of the sheet.

18. A non-transitory recording medium storing a computer-readable program for obtaining paper information in a system including an image forming apparatus, the image forming apparatus including:
a print engine that forms an image on a sheet;
a sheet conveyer that conveys a sheet on which the print engine formed an image, along a sheet path;
at least one reflection-type optical sensor that measures a sheet in the sheet path; and
at least one backing, facing the at least one reflection-type optical sensor across the sheet path, configured to change optical density of a backing face which is to be placed under a sheet in the sheet path for a measurement of the sheet with each of the at least one reflection-type optical sensor,
the program comprising instructions which, when executed by a hardware processor in the system, cause the hardware processor to perform operations comprising:
controlling the optical density of the backing face for each measurement of a sheet in the sheet path;
causing the at least one reflection-type optical sensor to take measurements of the sheet in the sheet path by using different optical densities of the backing face; and
calculating paper weight, which is weight of paper per unit area, of the sheet on a basis of a result of the measurements.

19. The non-transitory recording medium of claim 18,
wherein the image forming apparatus further includes
at least one feed tray for containing sheets; and
a tray open/close sensor that detects opening and closing of the at least one feed tray,
wherein the operations further comprise:
causing the tray open/close sensor to monitor opening and closing of the at least one feed tray; and
performing the controlling the optical density, the causing the at least one reflection-type optical sensor and the calculating paper weight, in response to the tray open/close sensor detecting opening and closing of a feed tray among the at least one feed tray.

20. The non-transitory recording medium of claim 18,
wherein the at least one reflection-type optical sensor includes a line sensor arranged to face one side of a sheet in the sheet path, the at least one backing is configured to change color of the backing face to either of two backing colors with different optical densities, and the calculating paper weight includes obtaining a first measured value taken by a first measurement of the sheet in the sheet path with the line sensor by using one of the two backing colors, obtaining a second measured value taken by a second measurement of the sheet in the sheet path with the line sensor by using the other of the two backing colors, the second measurement being taken after conveyance of the sheet measured in the first measurement backward in the sheet path by the sheet conveyer, calculating a difference between the first measured value and the second measured value, and obtaining a value of the paper weight corresponding to the difference, on a basis of a relational expression between paper weight values of sheets and differences between measured values of sheets taken by measurements using the two backing colors, prepared in advance.

21. The non-transitory recording medium of claim 18, wherein the at least one reflection-type optical sensor includes two line sensors arranged to face two sides of a sheet in the sheet path, respectively, the at least one backing is configured to change color of the backing face to either of two backing colors with different optical densities, and the calculating paper weight includes obtaining a first measured value taken by a first measurement of the sheet in the sheet path with one of the two line sensors by using backing color with darker density among the two backing colors, obtaining a second measured value taken by a second measurement of the sheet in the sheet path with the other of the two line sensors by using backing color with lighter density among the two backing colors, calculating a difference between the first measured value and the second measured value, and obtaining a value of the paper weight corresponding to the difference, on a basis of a relational expression between paper weight values of sheets and differences between measured values of sheets taken by measurements using the two backing colors, prepared in advance.

22. The non-transitory recording medium of claim 21, the causing the at least one reflection-type optical sensor includes causing a first line sensor among the two line sensors, arranged to face one side of a sheet in the sheet path, to take a measurement of the sheet in the sheet path by using the backing color with darker density, and causing a second line sensor among the two line sensors, arranged to face the other side of a sheet in the sheet path, to take a measurement of the sheet in the sheet path by using the backing color with lighter density.

23. The non-transitory recording medium of claim 22, wherein the controlling the optical density, the causing the at least one reflection-type optical sensor and the calculating paper weight are performed together with a process of correction of print-image quality using a correction chart printed by the print engine on a sheet, including a register mark printed on a certain side of the sheet, where the process of correction of print-image quality is performed on a basis of a measured value taken by a measurement of the correction chart with the first line sensor facing the certain side of the sheet, by using the backing color with darker density, and the calculating paper weight includes calculating the paper weight of the sheet by using the first measured value taken by a measurement of a non-image area of the correction chart with the first line sensor facing the certain side of the sheet by using the backing color with darker density, in the process of correction of print-image quality, and the second measured value taken by a measurement of a non-image area of the correction chart with the second line sensor facing the other side of the sheet by using the backing color with lighter density.

24. The non-transitory recording medium of claim 23, wherein the correction chart further includes a control strip to be used for the correction print-image quality.

25. The non-transitory recording medium of claim 18, wherein the at least one reflection-type optical sensor includes a line sensor arranged to face one side of a sheet in the sheet path, and a spectrocolorimeter arranged to face one side of a sheet in the sheet path, the at least one backing is configured to change color of the backing face to either of two backing colors with different optical densities, and the calculating paper weight includes obtaining a first measured value taken by a first measurement of the sheet in the sheet path with the line sensor by using backing color with darker density among the two backing colors, obtaining a second measured value taken by a second measurement of the sheet in the sheet path with the spectrocolorimeter by using backing color with lighter density among the two backing colors, converting the second measured value by calculating an equivalent value of the second measured value in a measured value taken by the second measurement of the sheet with the line sensor, on a basis of a mathematical expression for conversion, prepared in advance, calculating a difference between the first measured value and the equivalent value, and obtaining a value of the paper weight corresponding to the difference, on a basis of a relational expression between paper weight values of sheets and differences between measured values of sheets taken by measurements using the two backing colors, prepared in advance.

26. The non-transitory recording medium of claim 21, wherein the controlling the optical density, the causing the at least one reflection-type optical sensor and the calculating paper weight are performed together with a process of positioning of print images on both sides of sheets, using a chart for the positioning of print images on both sides of sheets, printed by the print engine on a sheet, the chart including a register mark printed on each side of the sheet, where the process of positioning of print images on both sides of sheets is performed on a basis of measured values taken by measurements of the register marks on both sides of the sheet in the sheet path with the two line sensors, by using black backing color, and the calculating paper weight includes calculating the difference and obtaining the value of the paper weight by using a first measured value taken by a measurement of a non-image area of the chart with one of the two lines sensors by using the black backing color, in the process of positioning of print images on both sides of sheets, and a second measured value taken by a measurement of a non-image area of the chart with the one of the two line sensors by using white backing color, the second measured value being taken after conveyance of the chart measured by using the black backing color backward in the sheet path by the sheet conveyer.

27. The non-transitory recording medium of claim 21, wherein the at least one reflection-type optical sensor further includes a spectrocolorimeter arranged to face one side of a sheet in the sheet path, wherein the controlling the optical density, the causing the at least one reflection-type optical sensor and the calculating paper weight are performed together with a process of positioning of print images on both sides of sheets, using a chart for the positioning of print images on both sides of sheets, printed by the print engine on a sheet, the chart including a register mark printed on each side of the sheet, where the process of positioning of print images on both sides of sheets is performed on a basis of measured values taken by measurements of the register marks on both sides of the sheet in the sheet path with the two line sensors, by using black backing color, and the calculating paper weight include
 obtaining a first measured value taken by a measurement of a non-image area of the chart with one of the two lines sensors by using the black backing color, in the process of positioning of print images on both sides of sheets,
 obtaining a second measured value taken by a measurement of a non-image area of the chart with the spectrocolorimeter by using white backing color,
 converting the second measured color by calculating an equivalent value of the second measured value in a measured value taken by the second measurement of the chart with the one of the two line sensors, on a basis of a mathematical expression for conversion, prepared in advance,
 calculating a difference between the first measured value and the equivalent value, and
 obtaining a value of the paper weight corresponding to the difference, on a basis of a relational expression between paper weight values of sheets and differences between measured values of sheets taken by measurements using the black and white backing colors, prepared in advance.

28. A method of obtaining paper information in a system including an image forming apparatus, the image forming apparatus including:
 a print engine that forms an image on a sheet;
 a sheet conveyer that conveys a sheet on which the print engine formed an image, along a sheet path;
 at least one reflection-type optical sensor that measures a sheet in the sheet path; and
 at least one backing, facing the at least one reflection-type optical sensor across the sheet path, configured to change optical density of a backing face which is to be placed under a sheet in the sheet path for a measurement of the sheet with each of the at least one reflection-type optical sensor,
the method comprising:
 controlling the optical density of the backing face for each measurement of a sheet in the sheet path;
 causing the at least one reflection-type optical sensor to take measurements of the sheet in the sheet path by using different optical densities of the backing face; and
 calculating paper weight, which is weight of paper per unit area, of the sheet on a basis of a result of the measurements.

29. The method of claim 28,
wherein the image forming apparatus further includes
at least one feed tray for containing sheets; and
a tray open/close sensor that detects opening and closing of the at least one feed tray,
wherein the method further comprises:
 causing the tray open/close sensor to monitor opening and closing of the at least one feed tray; and
 performing the controlling the optical density, the causing the at least one reflection-type optical sensor and the calculating paper weight, in response to the tray open/close sensor detecting opening and closing of a feed tray among the at least one feed tray.

30. The method of claim 28,
wherein the at least one reflection-type optical sensor includes a line sensor arranged to face one side of a sheet in the sheet path,
the at least one backing is configured to change color of the backing face to either of two backing colors with different optical densities, and
the calculating paper weight includes
 obtaining a first measured value taken by a first measurement of the sheet in the sheet path with the line sensor by using one of the two backing colors,
 obtaining a second measured value taken by a second measurement of the sheet in the sheet path with the line sensor by using the other of the two backing colors, the second measurement being taken after conveyance of the sheet measured in the first measurement backward in the sheet path by the sheet conveyer,
 calculating a difference between the first measured value and the second measured value, and
 obtaining a value of the paper weight corresponding to the difference, on a basis of a relational expression between paper weight values of sheets and differences between measured values of sheets taken by measurements using the two backing colors, prepared in advance.

31. The method of claim 28,
wherein the at least one reflection-type optical sensor includes two line sensors arranged to face two sides of a sheet in the sheet path, respectively,
the at least one backing is configured to change color of the backing face to either of two backing colors with different optical densities, and
the calculating paper weight includes
 obtaining a first measured value taken by a first measurement of the sheet in the sheet path with one of the two line sensors by using backing color with darker density among the two backing colors,
 obtaining a second measured value taken by a second measurement of the sheet in the sheet path with the other of the two line sensors by using backing color with lighter density among the two backing colors,
 calculating a difference between the first measured value and the second measured value, and obtaining a value of the paper weight corresponding to the difference, on a basis of a relational expression between paper weight values of sheets and differences between measured values of sheets taken by measurements using the two backing colors, prepared in advance.

32. The method of claim 31,
the causing the at least one reflection-type optical sensor includes
  causing a first line sensor among the two line sensors, arranged to face one side of a sheet in the sheet path, to take a measurement of the sheet in the sheet path by using the backing color with darker density, and
  causing a second line sensor among the two line sensors, arranged to face the other side of a sheet in the sheet path, to take a measurement of the sheet in the sheet path by using the backing color with lighter density.

33. The method of claim 32,
wherein the controlling the optical density, the causing the at least one reflection-type optical sensor and the calculating paper weight are performed together with a process of correction of print-image quality using a correction chart printed by the print engine on a sheet, including a register mark printed on a certain side of the sheet, where the process of correction of print-image quality is performed on a basis of a measured value taken by a measurement of the correction chart with the first line sensor facing the certain side of the sheet, by using the backing color with darker density, and
the calculating paper weight includes
  calculating the paper weight of the sheet by using
    the first measured value taken by a measurement of a non-image area of the correction chart with the first line sensor facing the certain side of the sheet by using the backing color with darker density, in the process of correction of print-image quality, and
    the second measured value taken by a measurement of a non-image area of the correction chart with the second line sensor facing the other side of the sheet by using the backing color with lighter density.

34. The method of claim 33,
wherein the correction chart further includes a control strip to be used for the correction print-image quality.

35. The method of claim 28,
wherein the at least one reflection-type optical sensor includes a line sensor arranged to face one side of a sheet in the sheet path, and a spectrocolorimeter arranged to face one side of a sheet in the sheet path,
the at least one backing is configured to change color of the backing face to either of two backing colors with different optical densities, and
the calculating paper weight includes
  obtaining a first measured value taken by a first measurement of the sheet in the sheet path with the line sensor by using backing color with darker density among the two backing colors,
  obtaining a second measured value taken by a second measurement of the sheet in the sheet path with the spectrocolorimeter by using backing color with lighter density among the two backing colors,
  converting the second measured value by calculating an equivalent value of the second measured value in a measured value taken by the second measurement of the sheet with the line sensor, on a basis of a mathematical expression for conversion, prepared in advance,
  calculating a difference between the first measured value and the equivalent value, and
  obtaining a value of the paper weight corresponding to the difference, on a basis of a relational expression between paper weight values of sheets and differences between measured values of sheets taken by measurements using the two backing colors, prepared in advance.

36. The method of claim 31,
wherein the controlling the optical density, the causing the at least one reflection-type optical sensor and the calculating paper weight are performed together with a process of positioning of print images on both sides of sheets, using a chart for the positioning of print images on both sides of sheets, printed by the print engine on a sheet, the chart including a register mark printed on each side of the sheet, where the process of positioning of print images on both sides of sheets is performed on a basis of measured values taken by measurements of the register marks on both sides of the sheet in the sheet path with the two line sensors, by using black backing color, and
the calculating paper weight includes
  calculating the difference and obtaining the value of the paper weight by using
    a first measured value taken by a measurement of a non-image area of the chart with one of the two lines sensors by using the black backing color, in the process of positioning of print images on both sides of sheets, and
    a second measured value taken by a measurement of a non-image area of the chart with the one of the two line sensors by using white backing color, the second measured value being taken after conveyance of the chart measured by using the black backing color backward in the sheet path by the sheet conveyer.

37. The method of claim 31,
wherein the at least one reflection-type optical sensor further includes a spectrocolorimeter arranged to face one side of a sheet in the sheet path,
wherein the controlling the optical density, the causing the at least one reflection-type optical sensor and the calculating paper weight are performed together with a process of positioning of print images on both sides of sheets, using a chart for the positioning of print images on both sides of sheets, printed by the print engine on a sheet, the chart including a register mark printed on each side of the sheet, where the process of positioning of print images on both sides of sheets is performed on a basis of measured values taken by measurements of the register marks on both sides of the sheet in the sheet path with the two line sensors, by using black backing color, and
the calculating paper weight include
  obtaining a first measured value taken by a measurement of a non-image area of the chart with one of the two lines sensors by using the black backing color, in the process of positioning of print images on both sides of sheets,
  obtaining a second measured value taken by a measurement of a non-image area of the chart with the spectrocolorimeter by using white backing color, converting the second measured color by calculating an equivalent value of the second measured value in a measured value taken by the second measurement of the chart with the one of the two line sensors, on a basis of a mathematical expression for conversion, prepared in advance, calculating a difference between the first measured value and the equivalent value, and obtaining a value of the paper weight corresponding to the difference, on a basis of a relational expression between paper weight values of sheets and differences between measured values of sheets taken by measurements using the black and white backing colors, prepared in advance.

* * * * *